(12) United States Patent
Kanaoka et al.

(10) Patent No.: US 6,982,937 B2
(45) Date of Patent: Jan. 3, 2006

(54) DATA REPRODUCING APPARATUS

(75) Inventors: Toshikazu Kanaoka, Kawasaki (JP); Masakazu Taguchi, Kawasaki (JP); Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 649 days.

(21) Appl. No.: 10/124,928

(22) Filed: Apr. 3, 2002

(65) Prior Publication Data

US 2003/0117914 A1    Jun. 26, 2003

(30) Foreign Application Priority Data

Dec. 25, 2001   (JP) .............................. 2001-392780

(51) Int. Cl.
*G11B 5/09*   (2006.01)
(52) U.S. Cl. ................. 369/47.17; 369/53.33
(58) Field of Classification Search ............ 369/47.17, 369/47.28, 53.12, 53.13, 53.14, 53.2, 53.22, 369/53.31, 53.33, 53.42, 53.44, 124.02, 124.07, 369/124.14
See application file for complete search history.

(56) References Cited

U.S. PATENT DOCUMENTS 5,361,136 A * 11/1994 Okuda .................... 386/115
6,724,702 B2 * 4/2004 Taguchi et al. .......... 369/47.17

FOREIGN PATENT DOCUMENTS

| JP | 5-205280 | 8/1993 |
| JP | 05204280 | 8/1993 |
| JP | 07254156 | 10/1995 |

* cited by examiner

*Primary Examiner*—Paul W. Huber
(74) *Attorney, Agent, or Firm*—Greer, Burns & Crain, Ltd.

(57) ABSTRACT

Crosstalk cancellation is realized more accurately than ever by considering both magnitude and a phase difference of a crosstalk signal from a recording track adjoining a target track, in comparison with magnitude and a phase of a desired signal from the target track, which is implemented by providing a crosstalk amount detection means, a phase difference measurement means, and a crosstalk component generation means that generates a crosstalk component to be subtracted from a signal obtained by an optical scanning that includes the desired signal and the crosstalk.

15 Claims, 20 Drawing Sheets

DATA REPRODUCING APPARATUS

BACKGROUND OF THE INVENTION

1. Field of the Invention

The present invention generally relates to a data reproducing apparatus such as a magnetic disk apparatus and an optical disk apparatus (including a magneto-optic disk apparatus), and specifically relates to the data reproducing apparatus that restores recorded data according to a predetermined algorithm from a reproduced signal, from which a crosstalk component from at least one adjoining track is removed, the reproduced signal being obtained by a reproducing head scanning recording tracks of a recording medium, such as an optical disk.

2. Description of the Related Art

In order to record data on a recording medium, such as an optical disk (including a magneto-optic disk), in high density, dimensions of recording bits and recording tracks have been miniaturized. The minute bits and the densely provided tracks cause a problem of wave shape interference to a reproduced signal. As a recording/reproducing technique for realizing highly precise data reproduction using this wave interference, a partial response—maximum likelihood (PRML) technique has been developed.

Another problem in a dense track situation such as above includes a cross-write and a crosstalk of a track with adjacent tracks.

The cross-write of, for example, an optical disk apparatus is caused by an optical beam being applied at a power higher than optimum when writing data. The optical beam of the power higher than the optimum protrudes into adjoining tracks beyond a target recording track, resulting in the cross-write. The cross-write deforms information recorded on an adjoining track, and information quality obtained from the recording track at the time of reproduction will deteriorate. The cross-write is avoidable by performing a strobe lighting and an accurate power adjustment of LD (Laser Diode) used as the light source of the optical beam such that heat distribution on an optical disk is controlled with a sufficient precision.

The crosstalk originates from the optical beam spot protruding into adjoining tracks beyond the target recording track at the time of data reproduction. By the protruding, signals from the adjoining tracks mix into a desired signal from the target recording track, which is the crosstalk and will appear as a jitter.

Conventional technology that solves the crosstalk problem has been disclosed, for example, by JP, 5-205280 and JP, 7-254156. There, the crosstalk is canceled by scanning the target recording track and two adjoining tracks thereof simultaneously by using three optical beams, and by deducting unwanted signals from the two adjoining tracks with an appropriate level adjustment from the signal obtained from the target track, which includes the unwanted signals.

However, since the three optical beams are needed with such conventional technology in order to retrieve signals simultaneously from the target recording track and the two adjoining tracks, dimensions of a reading head are enlarged, weight is heavier and cost is higher. Further, it is difficult to align phases between the retrieved signals, differences in the phases being caused by difference in travel distance of the three optical beams.

The JP, 5-205280 has also disclosed technology that cancels the crosstalk using a single optical beam. With this conventional technology, signal acquired from each adjoining track by the single optical beam is sampled by an analog to digital converter, and sampled values are stored beforehand in a memory unit. When a signal from the target recording track is retrieved by the optical beam, cancellation of a crosstalk is made using the sampled values that correspond to the adjoining track.

With such conventional technology, since only one optical beam is used, the optical head can be designed small. Further, there is no need to adjust the phase difference between signals supplied from a plurality of the optical beams.

However, it is difficult to form recording marks of a target recording track and its adjoining tracks in a circumference direction on an optical disk such that there is no phase difference altogether. Further, the target track is scanned by a central part of the optical beam spot, while the adjoining tracks are scanned by peripheral portions of the optical beam spot. For this reason, a phase of a desired signal from the target track is usually different from phases of unwanted signals from the adjoining tracks, which result in the crosstalk.

As described above, the conventional technology has attempted to deduct unwanted signals from retrieved signal, assuming that the phases of the desired signal and the unwanted signals are the same. Because the phases are different in fact, the unwanted signals from the adjoining tracks have not been completely removed from the signal obtained when scanning the target recording track.

SUMMARY OF THE INVENTION

Accordingly, it is a general object of the present invention to provide a data reproducing apparatus that is capable of canceling crosstalk as accurately as possible, substantially obviating one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the data reproducing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention basically provides a crosstalk amount detecting unit, a phase difference measuring unit, and a crosstalk component generating unit. Here, the crosstalk amount detecting unit detects magnitude of a crosstalk signal from at least one adjoining track, which is mixed with a signal of a target track, the phase difference measuring unit measures an amount of phase differences between the crosstalk signal and the signal of the target track, and the crosstalk component generating unit generates a crosstalk component that shall be deducted from the signal retrieved when scanning the target track, the signal including a desired signal and an unwanted signal.

In the data reproducing apparatus described above, the crosstalk component is generated based on the amount of the crosstalk and the amount of the phase differences obtained from a signal obtained from the adjoining track. Since the crosstalk component that is closer to an actual crosstalk in amplitude and phase is deducted from the signal that is retrieved by scanning the target track, original data is reproduced more accurately with a minimal crosstalk.

Here, the signal to be used for generating the crosstalk component may be a reproduced signal from the adjoining track, which is obtained by actually scanning the target track. Alternatively, the signal may be generated from data stored beforehand in a crosstalk data memory unit, the data being the same as data of the adjoining track, and reshaped according to reproducing characteristics of the data reproducing apparatus.

The present invention provides a crosstalk measurement area on a recording medium. A predetermined pattern is stored in each recording track such that the predetermined pattern does not occur simultaneously at adjoining tracks. While scanning a target track, a crosstalk signal mixed in a reproduced signal is detected, thereby a crosstalk amount is measured.

An amount of a phase difference of the crosstalk signal is determined by comparing the crosstalk signal that is obtained from actual scanning with an ideal crosstalk signal.

The phase difference can also be determined by comparing a sampled value sequence of the crosstalk signal based on a predetermined synchronous clock with a sampled value sequence of an ideal crosstalk wave. Here, the comparison is made by calculating differences of corresponding values of the crosstalk signal obtained by scanning and the ideal crosstalk signal.

As a specific methodology to obtain an amount of the phase difference, a cross-correlation based on a sum of products of the differences is employed, which will be described in detail later.

By shifting a relationship between the actual crosstalk signal and the ideal crosstalk signal, values of the cross-correlation are calculated, each of the values corresponding to each shifting amount. An shifting amount that provides a greatest value of the cross-correlation is determined as the phase difference amount.

Another methodology to obtain the phase difference amount is using a root mean square of the differences. Similarly to above, calculations are repeated to obtain root mean square values of the differences by shifting the relationship between the actual crosstalk and the ideal crosstalk. A shift amount that provides a smallest root mean square value is determined to be the phase amount.

When the shift amount gives the smallest root mean square value, the two waves, namely the actual crosstalk wave and the ideal crosstalk wave, coincide the best. That is why the shift amount that provides the smallest root mean square value can be regarded as the phase difference.

In order to obtain a higher resolution of the phase difference amount, a synchronous clock that has a higher frequency than a synchronous clock for signal reproduction may be employed.

The phase difference amount can be calculated using sampled values of the actual crosstalk and sampled values of the ideal crosstalk wave. A mutual relationship between the sampled values of the actual crosstalk and the sampled values of the ideal crosstalk is shifted in unit of the synchronous clock pulse, when calculating the cross-correlation values and the root mean square values.

Instead of the crosstalk signal obtained by actual scanning, the crosstalk component generating unit may use a signal generated by a reproduction signal generating unit. In this case, the reproduction signal generating unit generates the signal, using crosstalk basic data stored beforehand in a crosstalk data memory unit, where the crosstalk basic data is the same as data stored in the adjoining track. The signal is further processed based on reproducing characteristics of the data reproducing apparatus concerned. The processed signal is supplied to the crosstalk component generating unit.

Since the crosstalk basic data stored beforehand in the crosstalk data memory unit are expressed by a sequence of 0 and 1, a memory capacity smaller than conventional is sufficient.

The crosstalk generating unit of the present invention may include an interpolation processing unit that generates an interpolated data value sequence of the crosstalk signal. Sampled values of the crosstalk signal are obtained at a predetermined time interval. Interpolation values are inserted in the time interval at a shorter interval.

The interpolation may be realized by a linear interpolation and by a convolution process that uses the impulse response.

The convolution process may be realized by an FIR (Finite Impulse Response) filter.

The interpolation may be applied, not only to the sampled value sequence of the crosstalk signal obtained by actual scanning, as described above, but also to a sample value sequence obtained from the crosstalk basic data stored in the crosstalk data memory unit.

DESCRIPTION OF THE PREFERRED EMBODIMENTS

In the following, embodiments of the present invention will be described with reference to the accompanying drawings.

Figure 1:
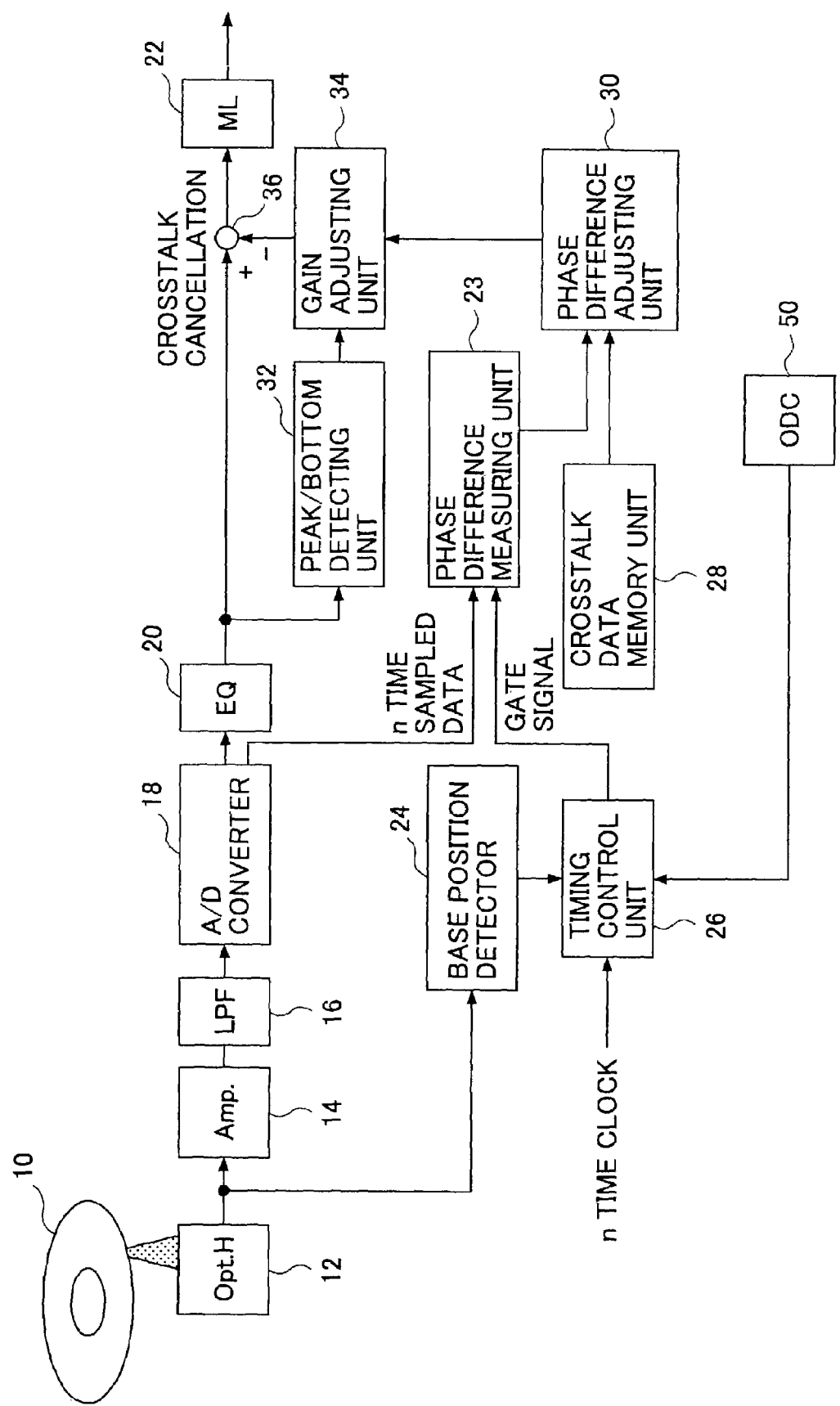
FIG. 1 is a block diagram showing an example of configuration of the data reproducing apparatus of an embodiment of the present invention.

An embodiment of the data reproducing apparatus of the present invention is structured as shown in FIG. 1. The data reproducing apparatus is used as a reproduction system of an optical disk apparatus (including a magneto-optic-disk apparatus).

As shown in FIG. 1, the data reproducing apparatus includes an optical head 12, an amplifier 14, a low pass filter 16, an analog to digital converter (henceforth an A/D converter) 18, and an equalizer (henceforth EQ) 20. The optical head 12 optically reads data recorded on a magneto-optic disk 10 used as a recording medium, and outputs the data as a signal. The signal is amplified by the amplifier 14, and is supplied to the A/D converter 18 after a high frequency noise component is removed by the low pass filter (LPF) 16, as a reproduced signal. The A/D converter 18 converts a level of the reproduced signal into a digital value (for example, in 6 bits) synchronizing with a predetermined clock (channel clock), and outputs digital values as a sequence of sampled values. The EQ 20 performs waveform equalization processing based on a signal wave form that should be reproduced from a magneto-optic disk 10 (for example, partial-response wave (PR wave)) to the sampled values supplied one by one from the A/D converter 18.

The data reproducing apparatus further includes a subtractor 36 and a maximum likelihood (ML) decoder 22. The subtractor 36 subtracts a. crosstalk component generated by the EQ 20, to be mentioned later, from sampled values to which waveform equalization processing has been applied such that crosstalk is cancelled. The maximum likelihood decoder 22 is configured by, for example, a Viterbi decoder, and reproduces original data from the sampled values that are input one by one, to which the crosstalk cancellation has been applied, according to a Viterbi decoding algorithm corresponding to the partial response wave (PR wave).

Figure 2:
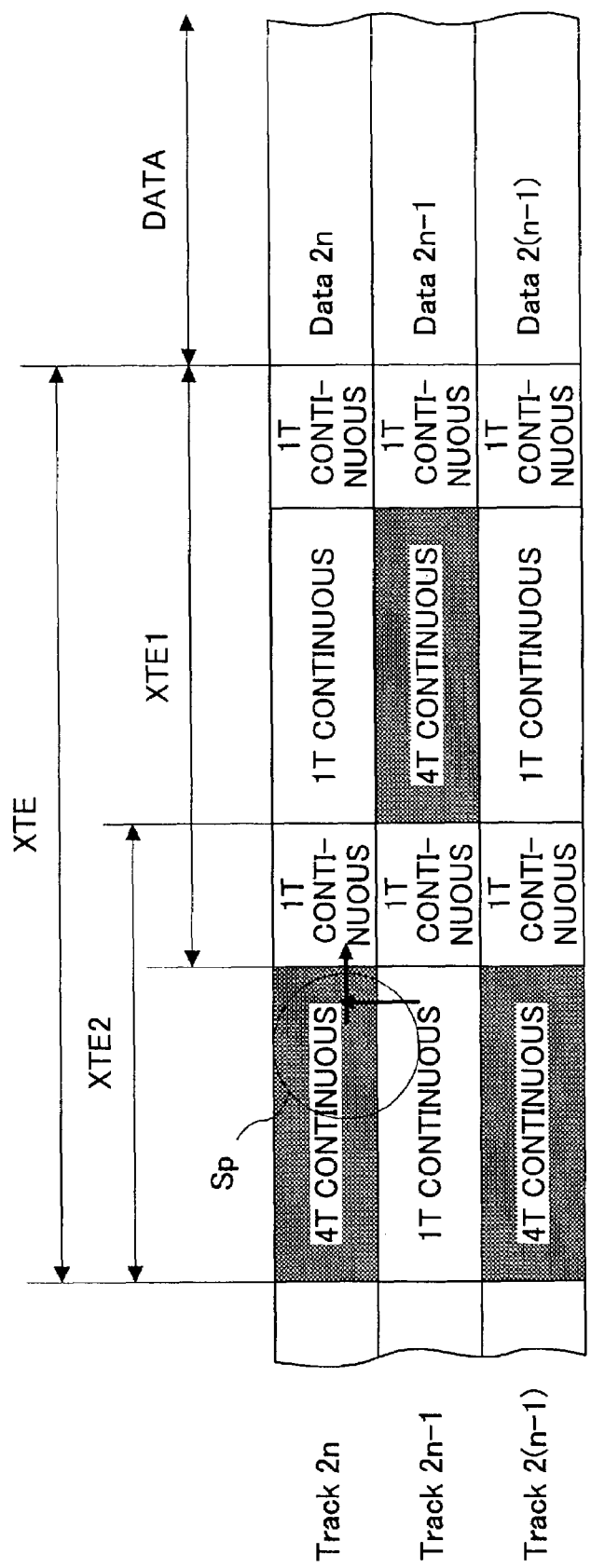
FIG. 2 is a figure showing an example of a recording pattern of a crosstalk measurement area on a recording medium.

As a magneto-optic disk 10, an MSR (magnetically induced super resolution) medium is used, for example, and the recording format thereof is as shown in FIG. 2.

In FIG. 2, a crosstalk measurement area (XTE) is formed before a data area (DATA) in which data (including address information) are written. The crosstalk measurement area (XTE) includes a first crosstalk measurement area (XTE1) and a second crosstalk measurement area (XTE2), aligned in the rotating direction of the magneto-optic disk 10. In an even-numbered recording track, a 4T continuous signal is written in the second crosstalk measurement area (XTE2), and a 1T continuous signal is written in the first crosstalk measurement area (XTE1). Conversely, in an odd-numbered recording track, a 4T continuous signal is written in the first crosstalk measurement area (XTE1), and a 1T continuous signal is written in the second crosstalk measurement area (XTE2). Thereby, a part of the 1T continuous signals of the even-numbered recording track and a part of the 1T continuous signals of the odd-numbered recording track are located side by side, and the 4T continuous signals and the 1t continuous signals are arranged alternately.

An optical beam spot Sp is applied by the optical head 12 to the recording tracks of the magneto-optic disk 10 as shown in FIG. 2. Specifically, a part of the beam protrudes into an adjoining track from the recording track that is being reproduced (the target recording track). A crosstalk occurs by the superfluous projection of the optical beam spot Sp to the adjoining track.

Reproduction of the 4T continuous signal obtains a signal that repeatedly vibrates at a given amplitude. Conversely, reproduction of the 1T continuous signal obtains a signal that is almost fixed to zero level. Therefore, if there are no crosstalk, a reproduced signal obtained from the even-numbered recording track (2n), for example, looks like as shown in FIG. 3, and looks like as shown in FIG. 4 when there is a crosstalk.

Figure 3:
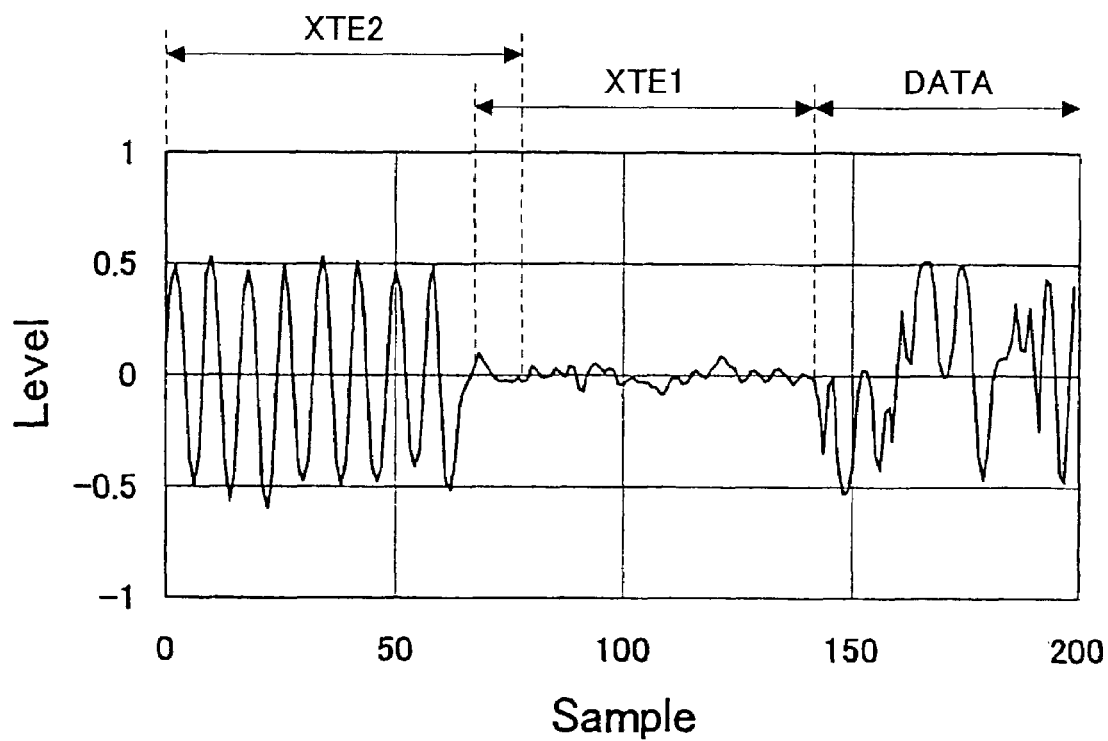
FIG. 3 is a figure showing an example of a signal wave where there is no crosstalk from an adjoining track of the crosstalk measurement area.
Figure 4:
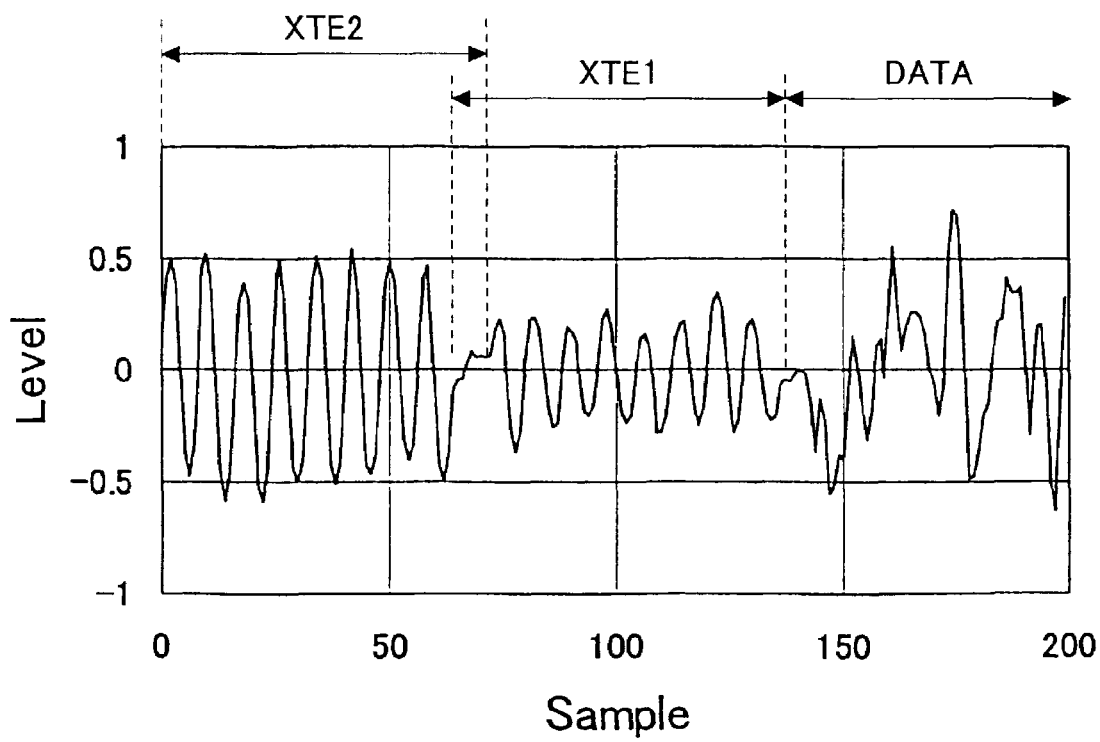
FIG. 4 is a figure showing an example of a signal wave where there is a crosstalk from the adjoining track of the crosstalk measurement area.

When there is no crosstalk, a signal reproduced from the second crosstalk measurement area (XTE2) becomes a wave with the predetermined amplitude corresponding to the 4T continuous signal written in the even-numbered recording track (2n), and a signal reproduced from the first crosstalk measurement area (XTE1) is almost fixed to the 0 level corresponding to the 1T continuous signal written in the even-numbered recording track (2n), as shown in FIG. 3.

In the case that there is a crosstalk, the signal reproduced from the second crosstalk measurement area (XTE2) includes a signal from the 4T continuous signal written in the even-numbered recording track (2n) and a signal reproduced from the 1T continuous signal written in the adjoining track (2n−1). However, the magnitude of the latter signal that is unwanted is almost at the zero level. Therefore, the signal reproduced from the second crosstalk measurement area (XTE2) is essentially the same as the 4T continuous signal of the even-numbered track, as shown in FIG. 4. Conversely, a signal reproduced from the first crosstalk measurement area (XTE1) includes the 1T continuous signal written in the even-numbered recording track (2n) that is fixed to almost at the 0 level, and the crosstalk signal from the 4T continuous signal in the adjoining track (2n−1).

Thus, the amount of the crosstalk (ratio) can be calculated based on a signal level of the 4T continuous signal obtained in the second crosstalk measurement area (XTE2), which is the desired signal, and a signal level of the crosstalk of the 4T continuous signal obtained in the first crosstalk measurement area (XTE1).

Figure 5:
FIG. 5 is a figure showing an example of a phase fluctuation of a crosstalk component.

Further, a phase of the crosstalk fluctuates, as compared with the desired signal, by various conditions, such as recording status of the 4T continuous signals, and relative position of the optical beam spot Sp and recording marks. An example of the phase fluctuation of the crosstalk signal is shown by a dashed line against the phase of the desired signal shown by a solid line in FIG. 5.

In contrast, when data is to be reproduced from an odd-numbered recording track (b 2n–1), the desired signal of the 4T continuous signal is obtained from the first crosstalk measurement area (XTE1), and the crosstalk component corresponding to the 4T continuous signal is obtained from the second crosstalk measurement area (XTE2).

With reference to FIG. 1, the data reproducing apparatus further includes a phase difference measuring unit 23, a base mark BM detector 24, a timing control unit 26, a crosstalk data memory unit 28, a phase difference adjusting unit 30, a peak/bottom detector 32, and a gain adjusting unit 34. The phase difference measuring unit 23 receives from the A/D converter 18 sampled values (henceforth, n-times sampled data) that are sampled at a 1/n cycle of a sampling period of a channel clock. The phase difference measuring unit 23 measures a phase difference between the crosstalk component based on the n-time sampled data of the 4T continuous signal from the adjoining track in the crosstalk measurement area (XTE), and an ideal crosstalk component corresponding to the 4T continuous signal (format data for crosstalk cancellation) at an ideal output timing. Details of the phase difference measuring unit 23 will be described later.

The base mark detector 24 detects predetermined base mark BM (for example, a header mark, a sync mark, a block mark, etc.) from the signal read by the optical head 12, and outputs a detected signal. The timing control unit 26 receives the n-time clock for sampling the n-time sampled data, the detected signal from the base mark BM detector 24, and track information indicating whether a track being read is an odd-numbered track or an even-numbered track from a control unit (ODC) 50. Further, the timing control unit 26 generates a gate signal that counts the n-time clock from input timing of the detected signal, and determines an acquisition period of the crosstalk component in the crosstalk measurement area (XTE). The gate signal is provided to the phase difference measuring unit 23.

The crosstalk data memory unit 28 stores data (sequence of 0 and 1) reproduced in a data area (DATA) of each recording track as crosstalk basic data. The crosstalk basic data is used in order to generate a crosstalk component at the time of reproduction of the recording track adjoining to the recording track at which the crosstalk basic data was obtained.

The phase difference adjusting unit 30 restores a data value sequence representing a reproduced signal from the crosstalk basic data (binary data of 0 and 1) stored in the crosstalk data memory unit 28. The data value sequence corresponds to a PR wave that should be obtained, when the crosstalk basic data are reproduced by the data reproducing apparatus. The phase difference adjusting unit 30 further performs a phase adjustment of the data value sequence representing the reproduced signal restored based on phase difference information from the phase difference measuring unit 23, and outputs the data value sequence after the phase adjustment. Details of a phase adjusting unit 30 will be described later.

The peak/bottom detector 32 detects a peak value and a bottom value of the reproduced signal based on the sampled values of the reproduced signal corresponding to the 4T continuous signal of the crosstalk measurement area (XTE), which is output from the EQ 20. Then, the peak/bottom detector 32 detects the peak value and the bottom value of the crosstalk component based on the sampled values of the crosstalk component corresponding to the 4T continuous signal. Further, the peak/bottom detector 32 calculates a crosstalk amount that is a ratio of a difference of a peak value and a bottom value of the reproduced signal, to a difference of a peak value and a bottom value of the crosstalk component. The crosstalk amount is supplied to the gain adjusting unit 34 as gain information.

The gain adjusting unit 34 adjusts a gain of the data value sequence (corresponding to the crosstalk basic data) supplied from the phase difference adjusting unit 30, based on the ratio, and outputs the data value sequence after the gain adjustment as a crosstalk component for data reproduction. Then, as mentioned above, the subtractor 36 subtracts the crosstalk component from the sampled values of the reproduced signal, resulting in a crosstalk cancellation.

Figure 6:
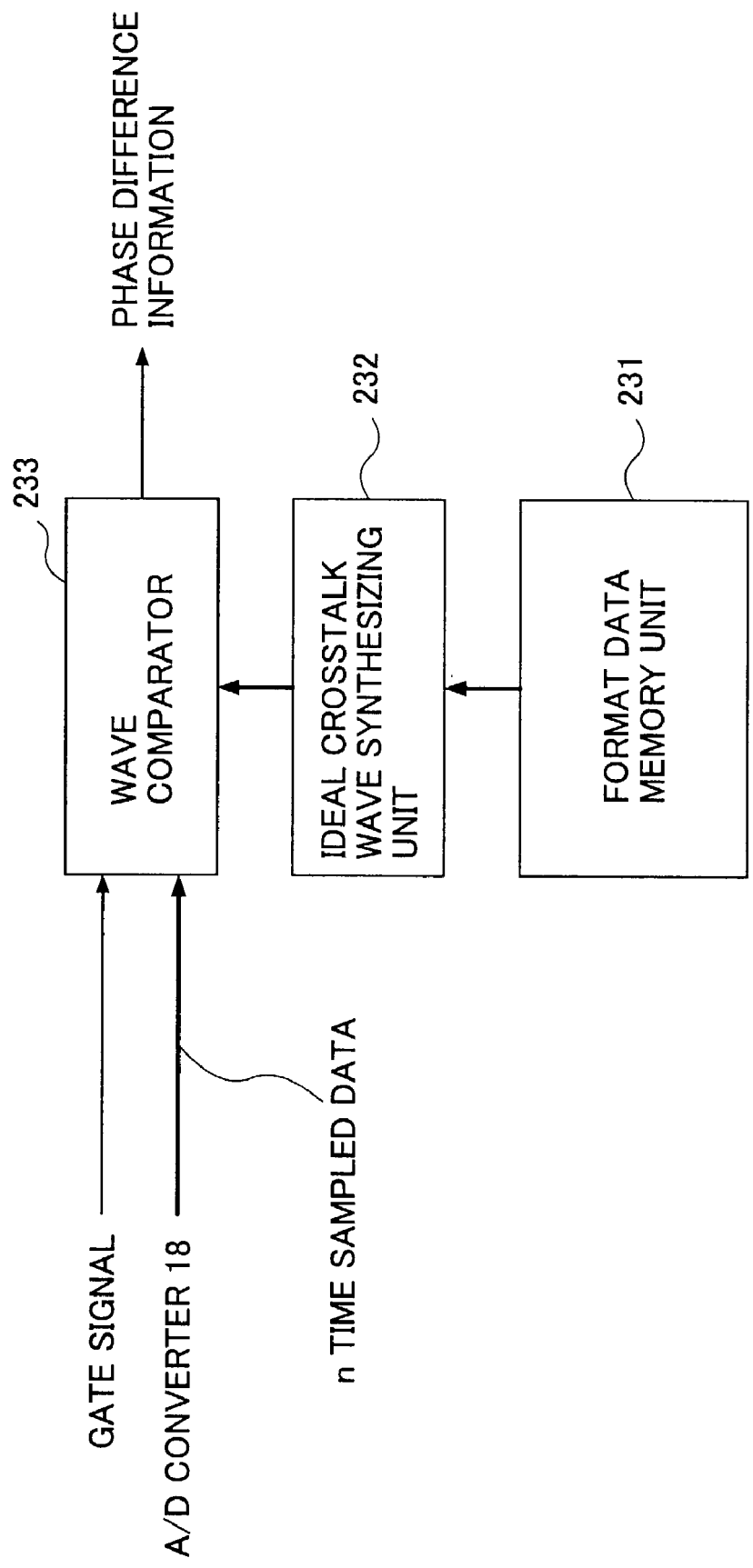
FIG. 6 is a block diagram showing an example of configuration of a phase difference measuring unit of the data reproducing apparatus shown in FIG. 1.

The phase difference measuring unit 23 is configured as shown in FIG. 6, and includes a format data memory unit 231, an ideal crosstalk wave synthesizing unit 232, and a wave comparator 233. The format data memory unit 231 stores the 4T continuous signal (sequence of 0 and 1) as format data for crosstalk cancellation, which is the same data as written in the crosstalk measurement area (XTE) of the magneto-optic disk 10. The ideal crosstalk wave synthesizing unit 232 generates a sampled value sequence in the n-time clock of a signal wave that should be obtained from the 4T continuous signal (format data) stored in the format data memory unit 231, as information of an ideal crosstalk wave.

Figure 7:
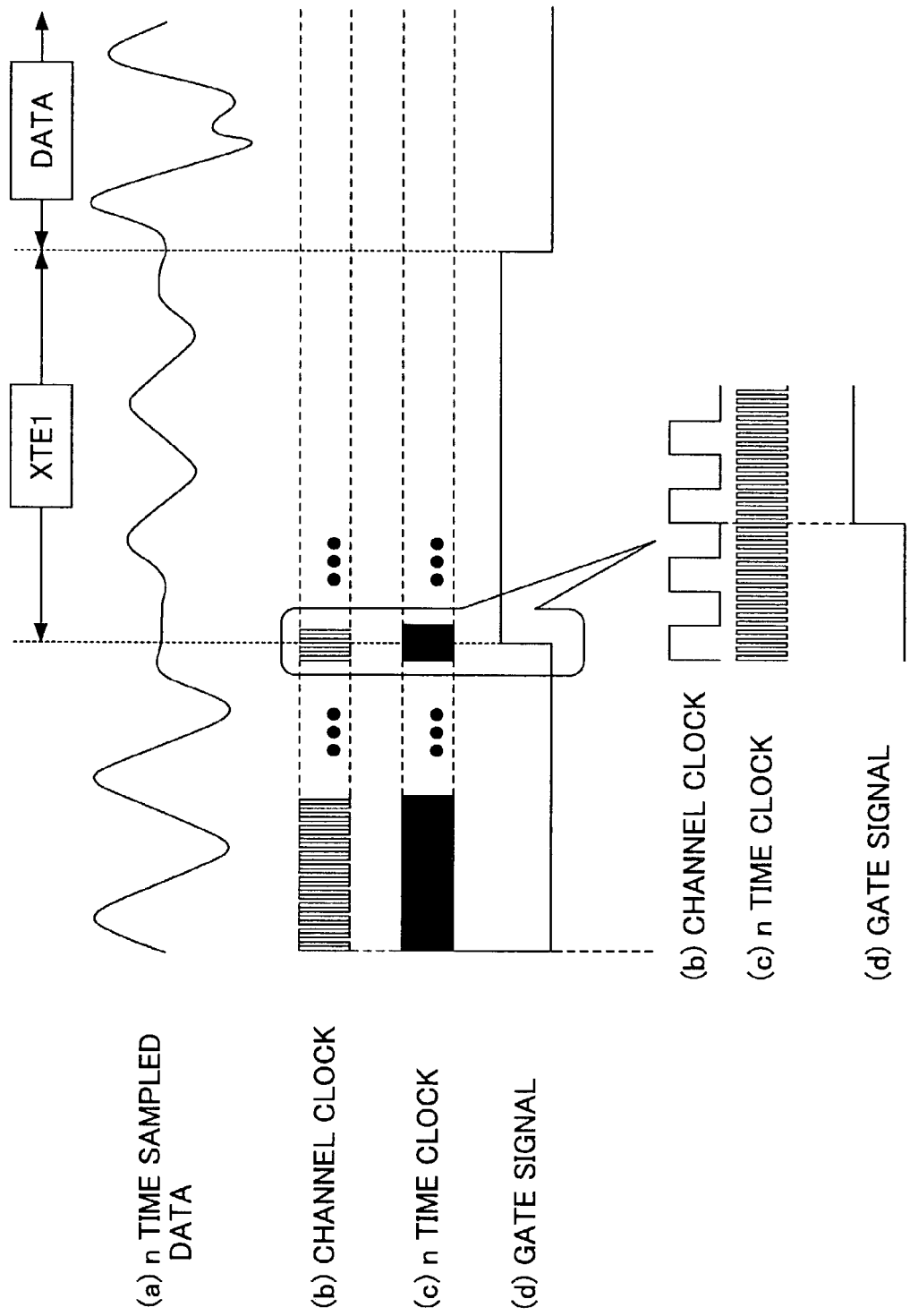
FIG. 7 is a timing chart showing an example of a relation between n-time sampled data obtained from an even-numbered recording track of the crosstalk measurement area and a gate signal from a timing control unit.
Figure 8:
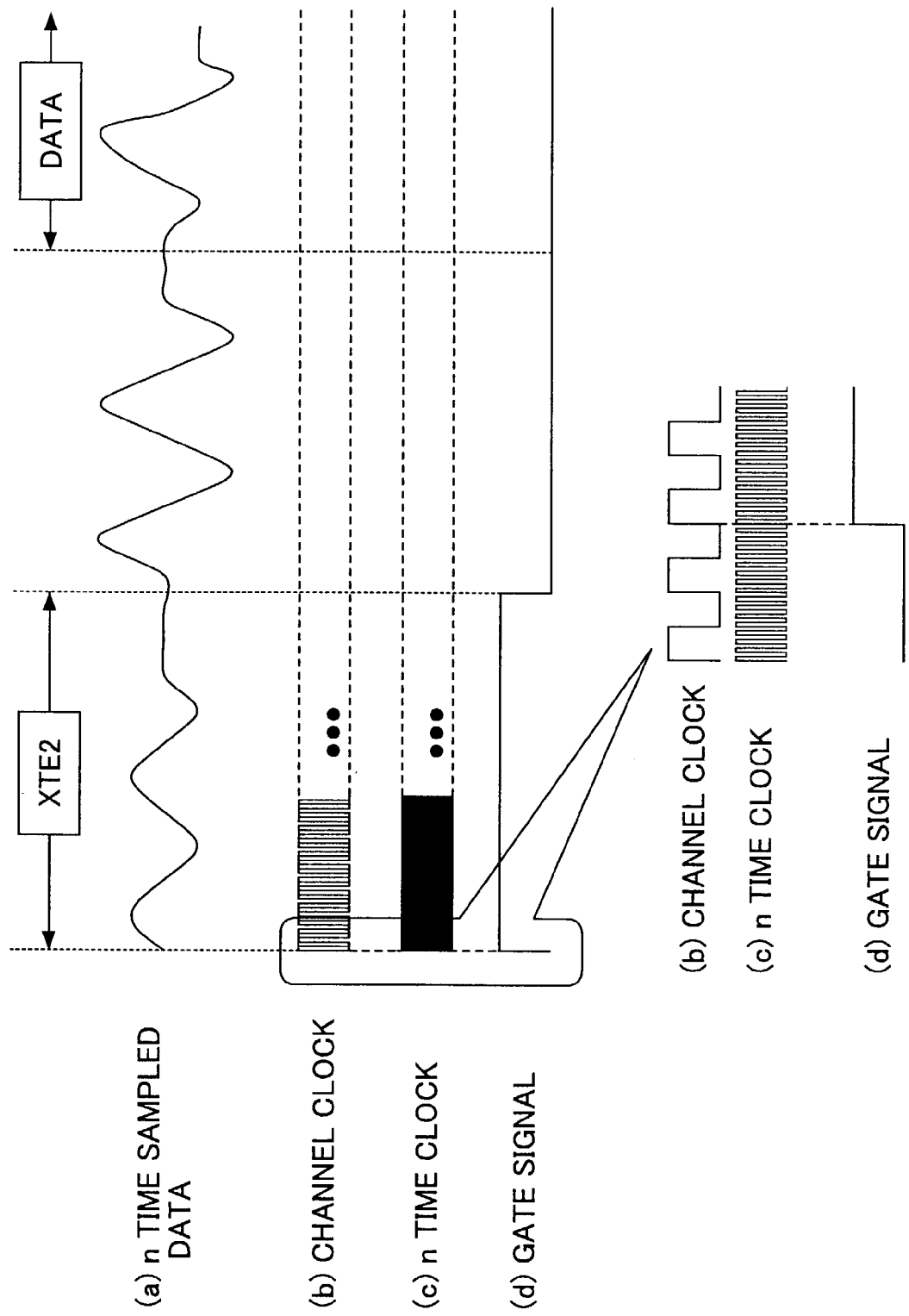
FIG. 8 is a timing chart showing an example of a relation between n-time sampled data obtained from an odd-numbered recording track of the crosstalk measurement area and a gate signal from the timing control unit.

With reference to FIG. 7, when reproducing an even-numbered recording track, the timing control unit 26 outputs a gate signal (as indicated by (d) in FIG. 7) that turns ON during the acquisition period of the n-time sampled data (indicated by (a) in FIG. 7: crosstalk component) in the first crosstalk measurement area (XTE1), which is determined based on the number of the n-time clock pulses (indicated by (c) of FIG. 7), counting of which starts from the detection timing of the base mark BM (for example, a header mark, a sync mark, and a block mark). Conversely, when reproducing an odd-numbered recording track, as shown in FIG. 8, the timing control unit 26 outputs a gate signal (indicated by (d) in FIG. 8) that turns ON during the acquisition period of the n-time sampled data (indicated by (a) in FIG. 8: crosstalk component) in the second crosstalk measurement area (XTE2), which is determined based on the number of n-time clock pulses (indicated by (c) in FIG. 8), counting of which starts from the detection timing of the base mark BM. The wave comparator 233 receives the n-time sampled data output from the A/D converter 18 during a period while the gate signal from the timing control unit 26 is turned ON, and calculates a phase difference between the wave expressed by the n-times sampled data and the ideal crosstalk wave from the ideal crosstalk wave synthesizing unit 232.

The wave comparator 233 determines a difference between the n-time sampled data value sequence showing the crosstalk component corresponding to the 4T continuous signal actually sampled in the acquisition period, and the sampled value sequence showing the ideal crosstalk wave (corresponding to the 4T continuous signal) that should ideally be acquired during the acquisition, which is the phase difference. The phase difference acquired as mentioned above is equivalent to a phase difference between the signal which should be obtained from the recording track during the acquisition, and the crosstalk component which should be obtained from an adjoining track during the acquisition, because the sampled value sequence representing the ideal crosstalk wave is a crosstalk component from the adjoining track corresponding to the sampled value sequence of the reproduced signal that should be obtained from the recording track during the acquisition.

Calculation of the phase difference can be performed according to the following technique.

According to a cross-correlation method, the phase difference of the two waves can be calculated.

The cross-correlation function $R(\tau)$ of the two waves $v_1$ and $v_2$ is defined as follows.

$$R(\tau) = \lim_{T \to \infty} \frac{1}{T} \int_{-T/2}^{T/2} v_1(t) v_2(t+\tau) dt \quad \text{Equation 1}$$

The cross-correlation value $R(\tau)$ between a crosstalk component $v_1$ that is actually acquired from the first crosstalk measurement area (XTE1) or the second crosstalk measurement area (XTE2), and the ideal crosstalk wave $v_2$ is calculated according to the formula. Specifically, the cross-correlation value $R(\tau)$ of the crosstalk component $v_1(t)$ and the ideal crosstalk wave $v_2(t+\tau)$ is calculated based on a sum of products of each value of the n-time sampled value sequence representing the crosstalk component $v_1(t)$, and each value of the sampled value sequence representing the ideal crosstalk wave $v_2(t+\tau)$. Then, a cross-correlation value $R(\tau)$ is calculated based on a sum of products of the value of the n-time sampled value sequence of the crosstalk component $v_1$, and the value of the sampled value sequence of the ideal crosstalk wave $v_2$, incrementing the $\tau$ by an amount equivalent to one cycle of the n-time clock. A value of $\tau$ that gives a greatest cross-correlation value $\max R(\tau)$ is determined as the phase difference amount.

Further, the phase difference of the two waves can be calculated according to the least squares method.

Specifically, a mean square error $S(\tau)$ (MSE) between the crosstalk components $v_1(t)$ that are actually acquired from the first crosstalk measurement area (XTE1) or the second crosstalk measurement area (XTE2), and the ideal crosstalk waves $v_2(t)$, according to the following formula.

$$S(\tau) = \frac{1}{T} \int_{-T/2}^{T/2} \sqrt{(v_1(t) - v_2(t+\tau))^2} \, dt \quad \text{Equation 2}$$

Above formula is applied to each of the values of the n-times sampled value sequence, representing the crosstalk component $v_1(t)$, and each value of the ideal crosstalk wave $v_2(t)$, representing the ideal crosstalk wave. Further, calculations of the $S(\tau)$ are performed with $\tau$ incremented by an amount equivalent to one cycle of the n-time clock. A clock value $\tau$ of the n-time clock that gives a least value of $S(\tau)$ is determined as the phase difference amount.

While the crosstalk measurement area (XTE) of the magneto-optic disk 10 is scanned by the optical head 12, the phase difference measuring unit 23 calculates the phase difference (the number of clocks of the n-time clock) between the crosstalk component $v_1(t)$ corresponding to the 4T continuous signal obtained in the crosstalk measurement area (XTE), and the ideal crosstalk wave $v_2(t)$ as mentioned above, and stores the phase difference (the number of clocks of a n-time clock, which give the smallest $S(\tau)$ value) that is obtained.

While the optical head 12 scans the data area (DATA) of each recording track of the magneto-optic disk 10, an actual crosstalk component is processed through the phase difference adjusting unit 30 and the gain adjusting unit 34.

Figure 9:
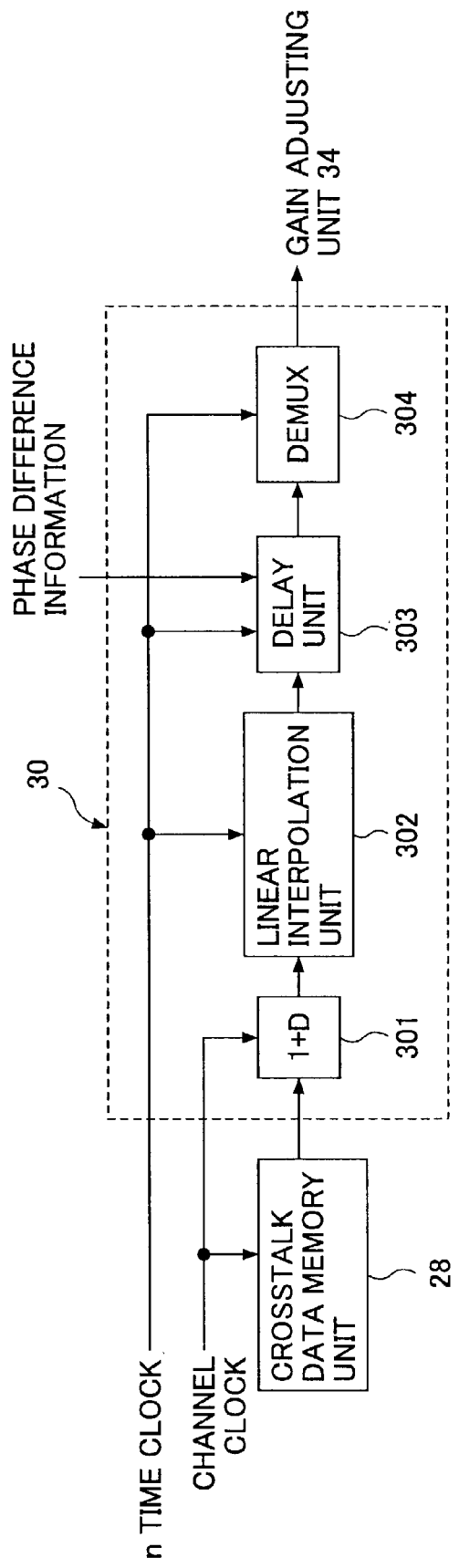
FIG. 9 is a block diagram showing a first configuration example of a phase difference adjusting unit of the data reproducing apparatus shown in FIG. 1.

The phase difference adjusting unit 30 is configured as shown in FIG. 9.

As shown in FIG. 9, the phase difference adjusting unit 30 includes a PR synthesizing unit 301, a linear interpolation unit 302, a delay unit 303, and a demultiplexer 304. The PR synthesizing unit 301 operates synchronizing with the channel clock used for sampling synchronization, and generates synthetic data corresponding to PR (partial response) properties of the reproducing characteristics of the data reproducing apparatus concerned, using the recorded data (crosstalk basic data, i.e., binary data of 0 and 1) of the adjoining track stored in the crosstalk data memory unit 28. For example, in the case of PR(11), the PR synthesizing unit 301 generates synthetic data according to the rule of (1+D) (a sum of the data value sequence obtained in a channel clock period, and the data value sequence that is delayed by one clock (D)). The synthetic data corresponds to a sampled value sequence (data value sequence) of a reproduced signal which should be obtained synchronizing with the channel clock, in the case that the crosstalk basic data are recorded on the magneto-optic disk 100.

The linear interpolation unit 302 operates synchronizing with the n-time clock, linearly interpolates between values of the data value sequence obtained by the PR synthesis, synchronizing with the n-time clock, and outputs the interpolated data. Consequently, the data value sequence corresponding to the n-time sampled data is output from the linear interpolation unit 302. The delay unit 303 acquires the phase difference detected by the phase difference measuring unit 23. Then, the delay unit 303 operates synchronizing with the n-time clock, delays the data value sequence after the linear interpolation, which can be considered equivalent to the n-time sampled data corresponding to the crosstalk basic data, by a duration determined in consideration of the phase difference amount as follows, and supplies the processed data sequence to the demultiplexer 304.

The delay time is determined by the delay unit 303 as follows.

Figure 10:
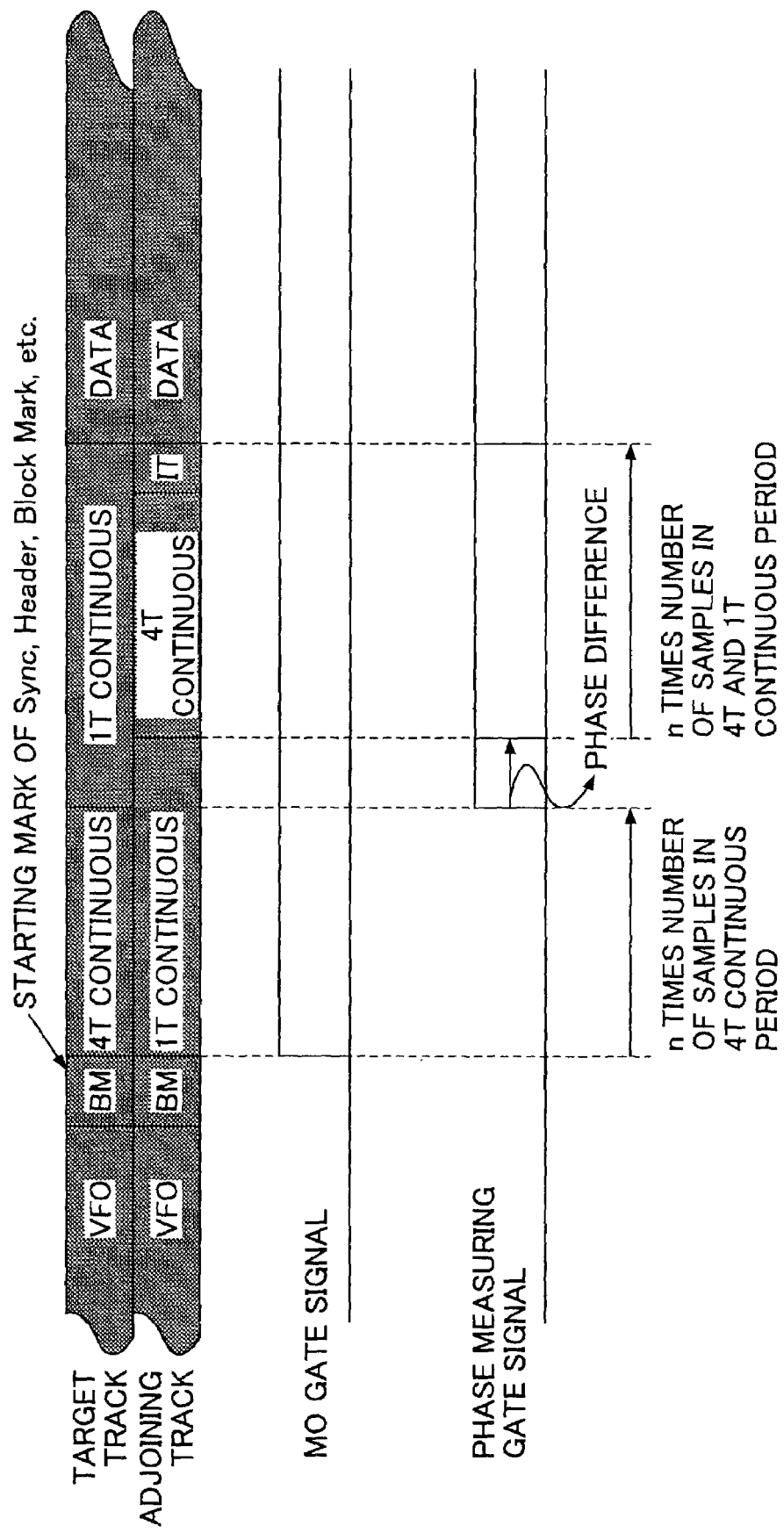
FIG. 10 is a figure showing a status of phase adjustment of a crosstalk component.

The delay time is a sum of n times the number of samples of the 4T continuous signal in the target track of the crosstalk measurement area as shown in FIG. 10 (corresponding to FIG. 2) based on the channel clock, n times the number of samples of the 4T continuous signal and the 1T continuous signal in the adjoining track based on the channel clock, and a timing difference between the timing when the 4T continuous signal in the adjoining track should be obtained, and the timing when the 4T continuous signal is actually obtained, namely the amount of the phase difference (expressed in the number of clocks of the n-time clock) measured by the phase difference measuring unit 23. Therefore, the delay unit 303 starts outputting the data value sequence after the linear interpolation, which is considered to be equivalent to the n-time sampled data of the signal corresponding to the crosstalk basic data, after the delay time elapsed from the base mark BM (for example, a header mark, a sync mark, or a block mark).

Figure 11:
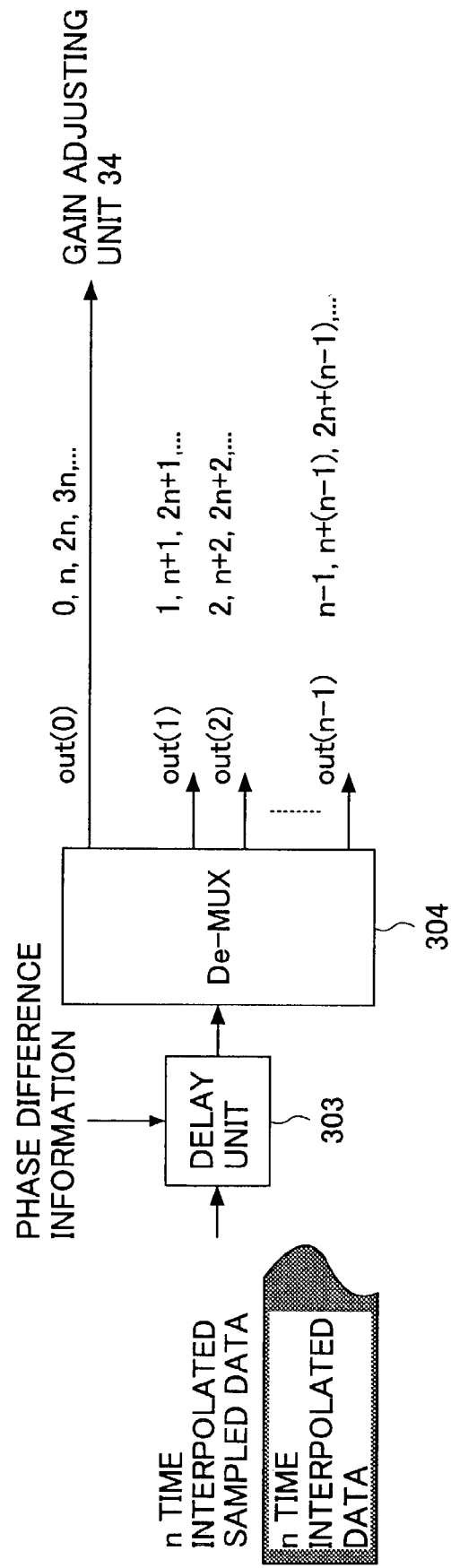
FIG. 11 is a figure snowing an example of an output control of the phase difference adjusting unit shown in FIG. 9.

The demultiplexer 304 that receives the data value sequence that is linear interpolated from the delay unit 303 includes n output terminals OUT(0), OUT(1), and through OUT(n−1) as shown in FIG. 11, and operates synchronizing with the n-time clock. The demultiplexer 304 distributes the n-time data value sequence supplied synchronizing with the n-time clock to the n output terminals one by one. The OUT(0) of the demultiplexer 304 outputs a 0-th value, an n-th value, an 2n-th value, an 3n-th value and so on of the data value sequence one by one. An output terminal OUT(i) outputs an i-th value, an (i+n)th value, an (i+2n)th value, and so on of the data value sequence, one by one. Here, the i ranges from 1 through n−1.

The demultiplexer 304 supplies the data value sequence output from the output terminal OUT(0) to the gain adjusting unit 34. Thus, the demultiplexer 304 thins out the data value sequence input to 1/n, and supplies the gain adjusting unit 34 with the thinned data value sequence that can be considered being synchronized with the channel clock as a data value sequence after the phase adjustment.

Figure 12:
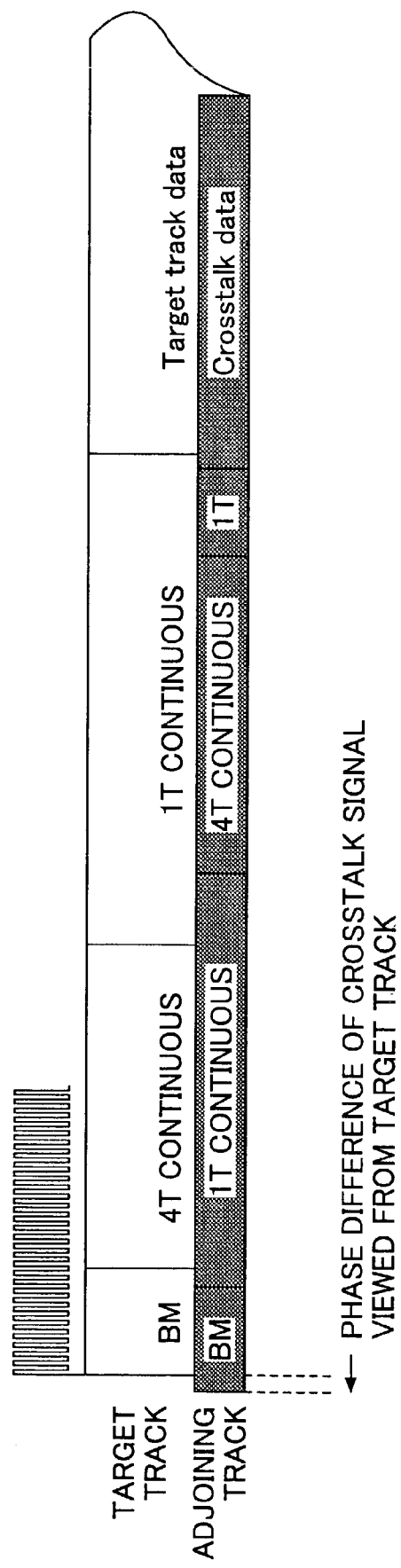
FIG. 12 is a figure showing an example of a phase difference of crosstalk data from target track data.

An output start phase of the crosstalk component (to be described later) is adjusted by the phase difference amount measured as above (the number of clock pulses of the n-time clock) by giving a delay at the delay unit 303, and selecting an output data value sequence from the demultiplexer 304. Consequently, the relative position of the reproduced signal (sampled values) between the target recording track and the crosstalk component (data value sequence) from an adjoining track is shifted by the phase difference as shown in FIG. 12, for example.

Here, in precaution that the 4T continuous signal from the adjoining track can be distinguished from the 4T continuous signal from the target track, even if the above phase difference amounts to several channel clock pulses (times n if measured by the n-time clock), the format of the crosstalk measurement area is structured such that the 4T continuous signal is located between two 1T continuous signals.

Here, although the output terminal of the demultiplexer 304 that supplies the data value sequence to the gain adjusting unit 34 is the 0th output terminal OUT(0) in this example, the output terminal can be changed depending on the delay time set up by the delay unit 303. For example, when the delay time becomes earlier by one clock of the n-time clock, the 1st output terminal OUT(1) that outputs a data value sequence later by one clock is chosen as the output terminal of the data value sequence to be supplied to the gain adjusting unit 34.

In reference to FIG. 1, the gain adjusting unit 34 adjusts the gain of the data value sequence after the phase adjustment supplied from the phase difference adjusting unit 30 as mentioned above, using the amount of the crosstalk (ratio) obtained as mentioned above. The data value after the gain adjustment is supplied to the subtractor 36 as a crosstalk component after the phase adjustment. The subtractor 36 subtracts the crosstalk component after the phase adjustment from the sampled value of the reproduced signal obtained by scanning the target track, and supplied from the EQ 20, and the crosstalk-cancelled sampled values are supplied to the maximum likelihood decoder 22. The maximum likelihood decoder 22 restores the data according to the maximum likelihood decoding algorithm (for example, Viterbi decoding algorithm) from the sampled values after the crosstalk cancellation, which is sequentially supplied.

As mentioned above, since the crosstalk component from an adjoining track after the phase difference adjustment is subtracted from the reproduced signal obtained from the target track, more accurate crosstalk cancellation is attained. Consequently, more accurate (i.e., a lower bit error rate) data reproduction is realized.

In the example mentioned above, the crosstalk basic data is obtained from the record data (a sequence of 0 and 1) obtained from the reproduced signal (that includes both a desired signal and a crosstalk) by the maximum likelihood decoding. In contrast, the conventional method (such as JP, 5-204280) stores sampled values (for example, 6-bit expression) of a reproduced signal as the crosstalk basic data. Thus, the present invention requires a smaller capacity of the crosstalk data memory unit 28 than the conventional method.

Figure 13:
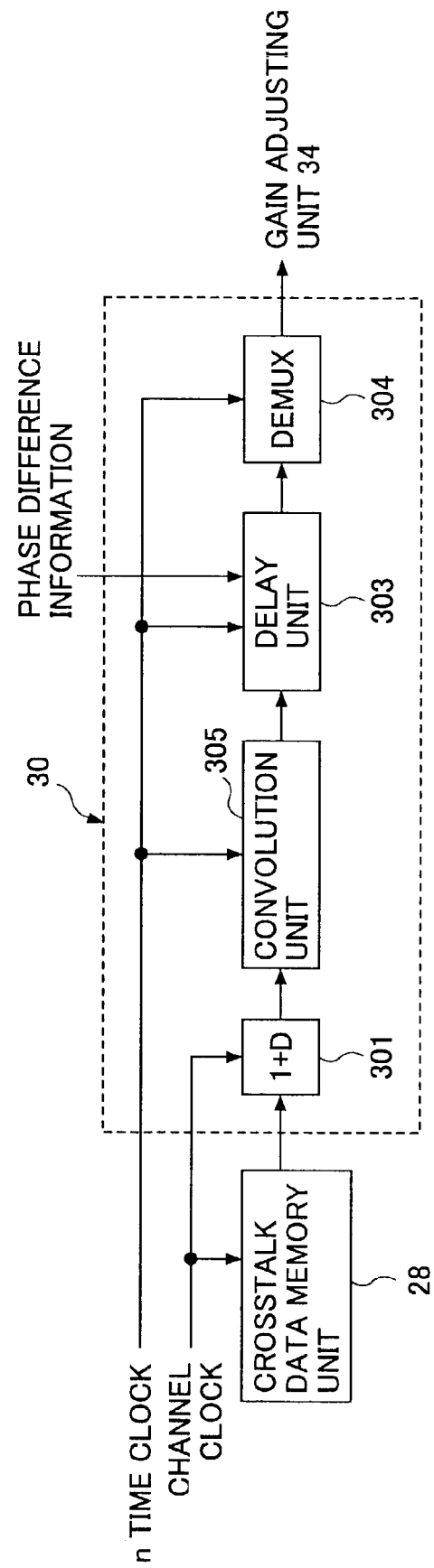
FIG. 13 is a block diagram showing a second configuration example of the phase difference adjusting unit of the data reproducing apparatus shown in FIG. 1.

The phase difference adjusting unit 30 can also be configured as shown in FIG. 13, wherein the same reference sign is attached to the same portion as shown in FIG. 9, and the detailed explanation thereof is omitted.

Figure 14:
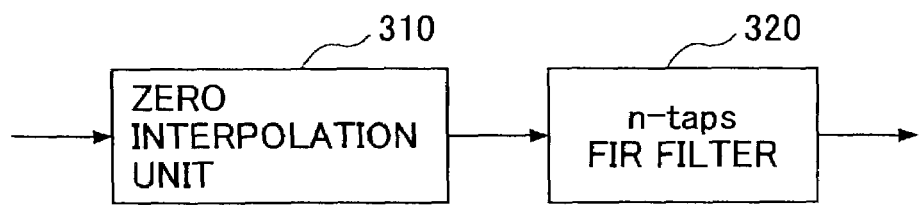
FIG. 14 is a block diagram showing a configuration example of an interpolation FIR filter in the phase difference adjusting unit shown in FIG. 13.

In FIG. 13, the phase difference adjusting unit 30 includes a convolution unit 305 in place of the linear interpolation unit 302 shown in FIG. 9. The convolution unit 305 includes a zero interpolation unit 310 and an FIR (finite impulse response) filter 320 as shown in FIG. 14

Figure 15:
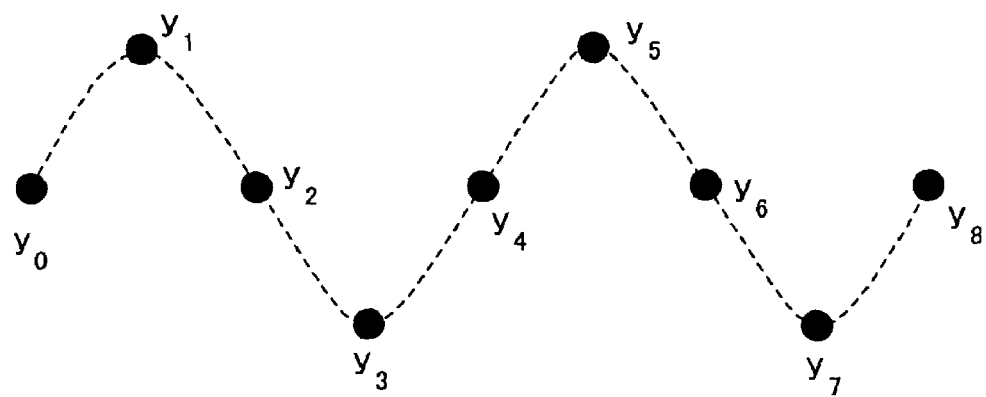
FIG. 15 is a figure showing an example of data value sequence that is synthesized by PR.
Figure 16:
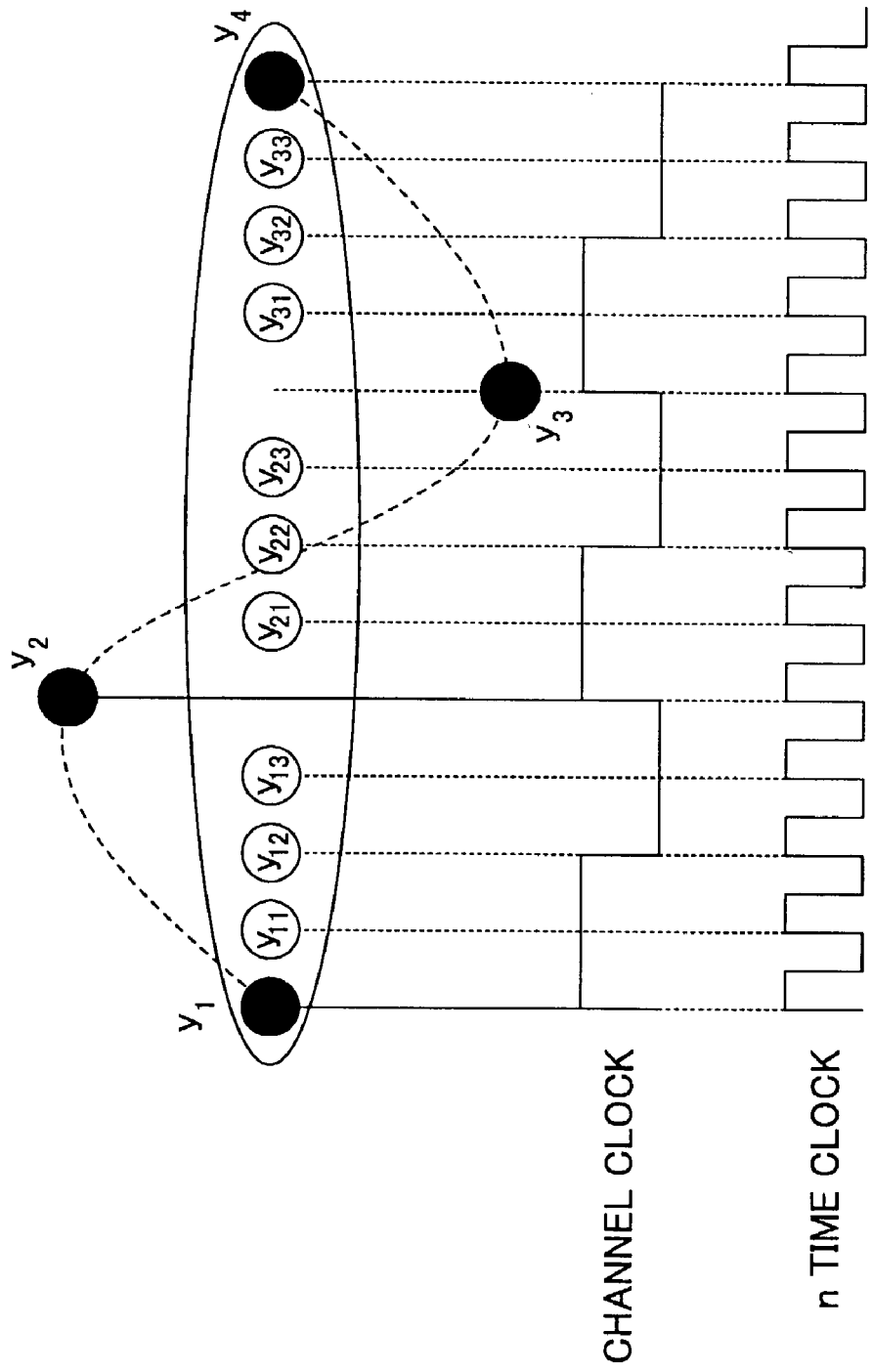
FIG. 16 is a figure showing an example of an interpolation data value sequence.

The PR synthesizing unit 301 outputs a data value sequence y0, y1, y2, and so on corresponding to a reproduced signal, as shown in FIG. 15, that is PR-synthesized from the crosstalk basic data that are synchronized with the channel clock. The zero interpolation unit 310 that receives the data value sequence operates synchronizing with the n-time clock, interpolates the data value sequence with zeroes as shown by y11, y12, y13, - - - , y21, y22, y23, and so on as shown in FIG. 16. Here, a zero represents a center value of peak values.

Figure 17:
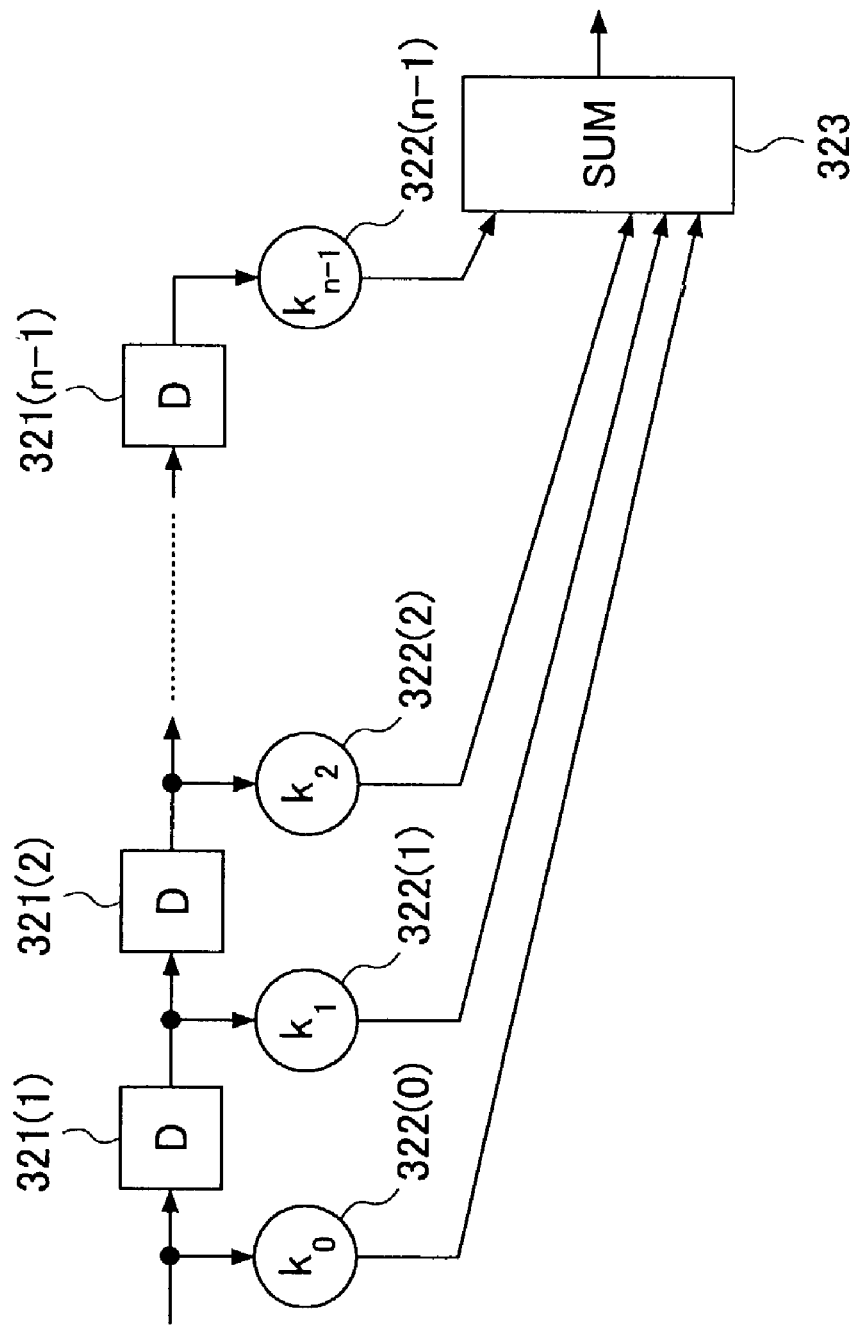
FIG. 17 is a figure showing a configuration example of the FIR filter in the interpolation FIR shown in FIG. 14.
Figure 18:
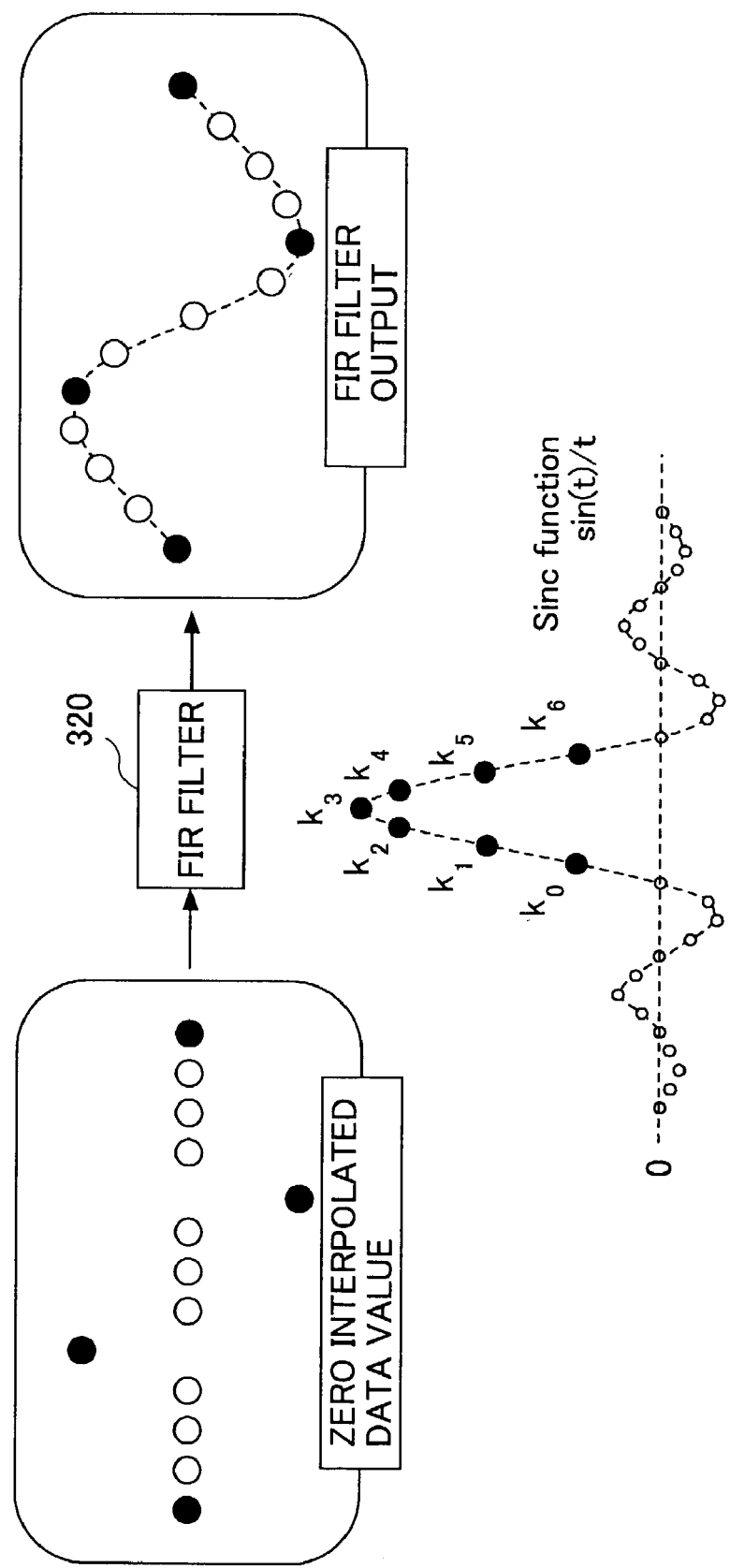
FIG. 18 is a figure showing processing of the FIR filter.

The FIR filter 320 shown in FIG. 17 includes n−1 delay units 321(1) through 321(n−1), n pieces of tap counting multiplication constants $k_0$ through $k_{n-1}$ referenced by 322 (0) through 322(n−1), respectively, and an adder 323. The FIR filter 320 operates synchronizing with the n-time clock, generates and outputs an interpolating data value sequence by convoluting the zero interpolated data value sequence provided from the zero interpolation unit 310, and the impulse response (Sinc function sin (t)/t) as shown in FIG. 18.

Thus, the interpolated data value sequence output from the FIR filter 320 is supplied to the delay unit 303, the same as shown in FIG. 9. The data value sequence that is supplied to the gain adjusting unit 34 is generated by processing through the delay unit 303, and later, by the demultiplexer 304, the same as shown in FIG. 9.

Figure 19:
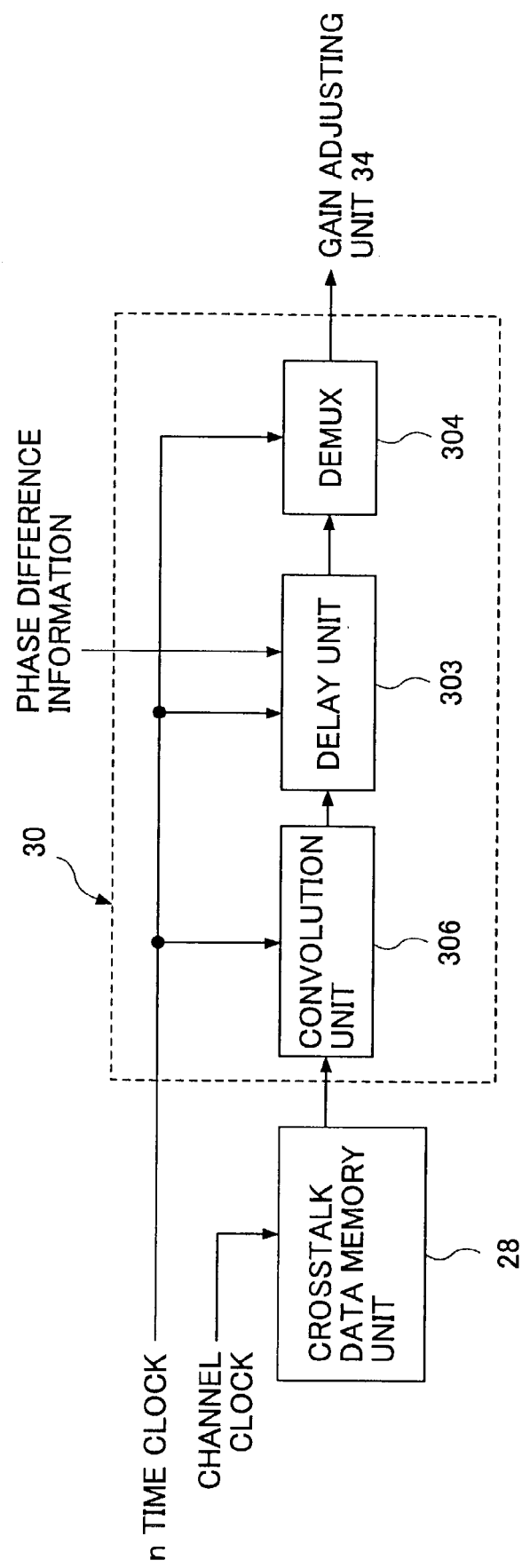
FIG. 19 is a block diagram showing a third configuration example of the phase difference adjusting unit of the data reproducing apparatus shown in FIG. 1.

In addition, the phase difference adjusting unit 30 can also be configured as shown in FIG. 19. In FIG. 19, the same reference sign is attached to the same portion as shown in FIG. 9 and FIG. 13, and the detailed explanation thereof is omitted.

The phase difference adjusting unit 30 in FIG. 19 includes a convolution unit 306 that contains functions of the PR synthesizing unit 301 and the convolution unit 305 shown in FIG. 13. The convolution unit 306 is configured such that the wave of the interpolation data value sequence obtained as a result of convolution processing includes PR properties. Thereby, the PR synthesizing unit 301 can be eliminated.

The convolution units 305 and 306 can also generate the same interpolation data value sequence by an interpolation process using the sine function, and an interpolation process using the Nyquist wave, besides using the impulse response as mentioned above.

Figure 20:
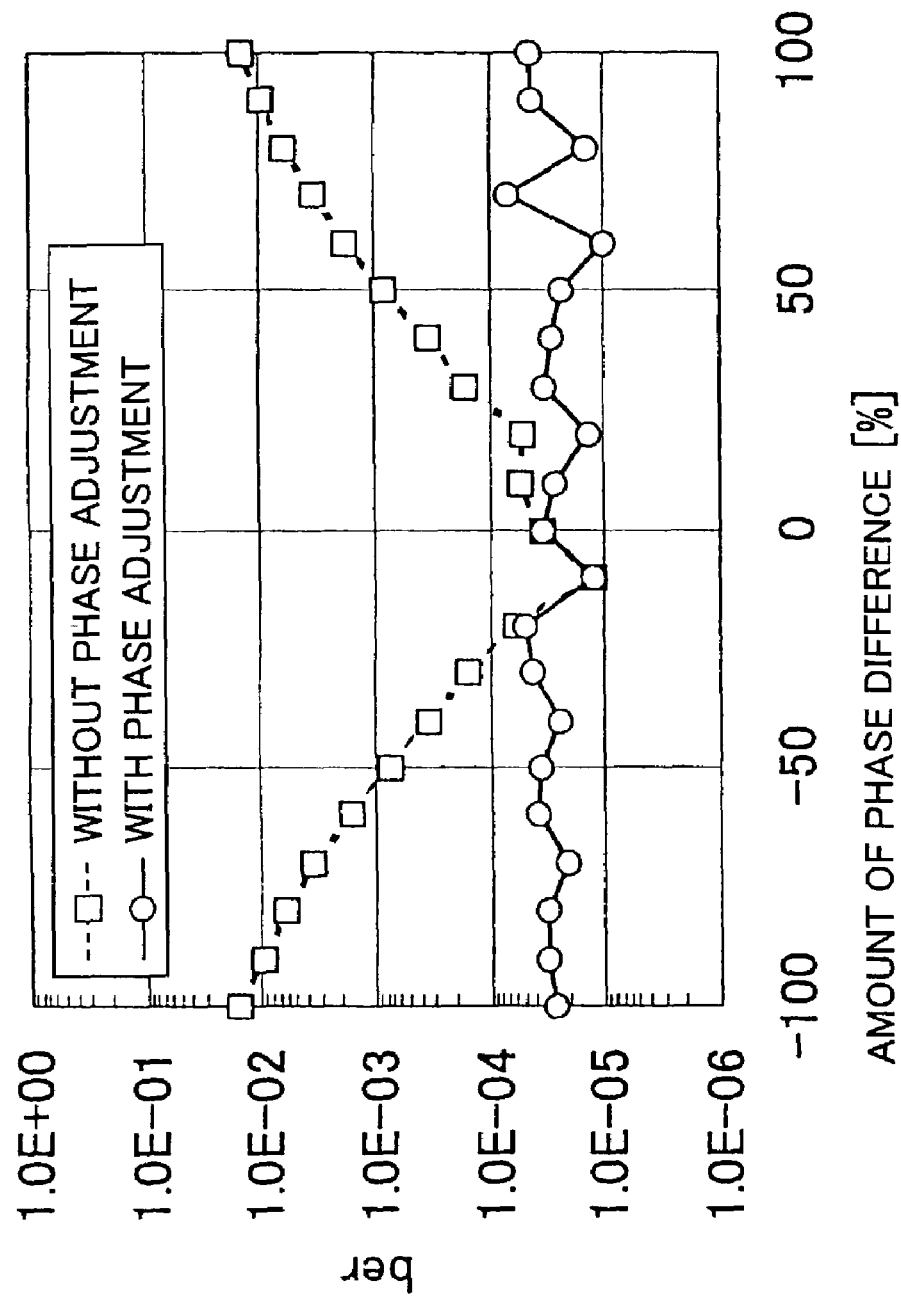
FIG. 20 is a figure showing an example of a relation between an amount of the phase difference and a bit error rate of reproduced data, to which crosstalk cancellation with and without phase compensation is applied.
Figure 21:
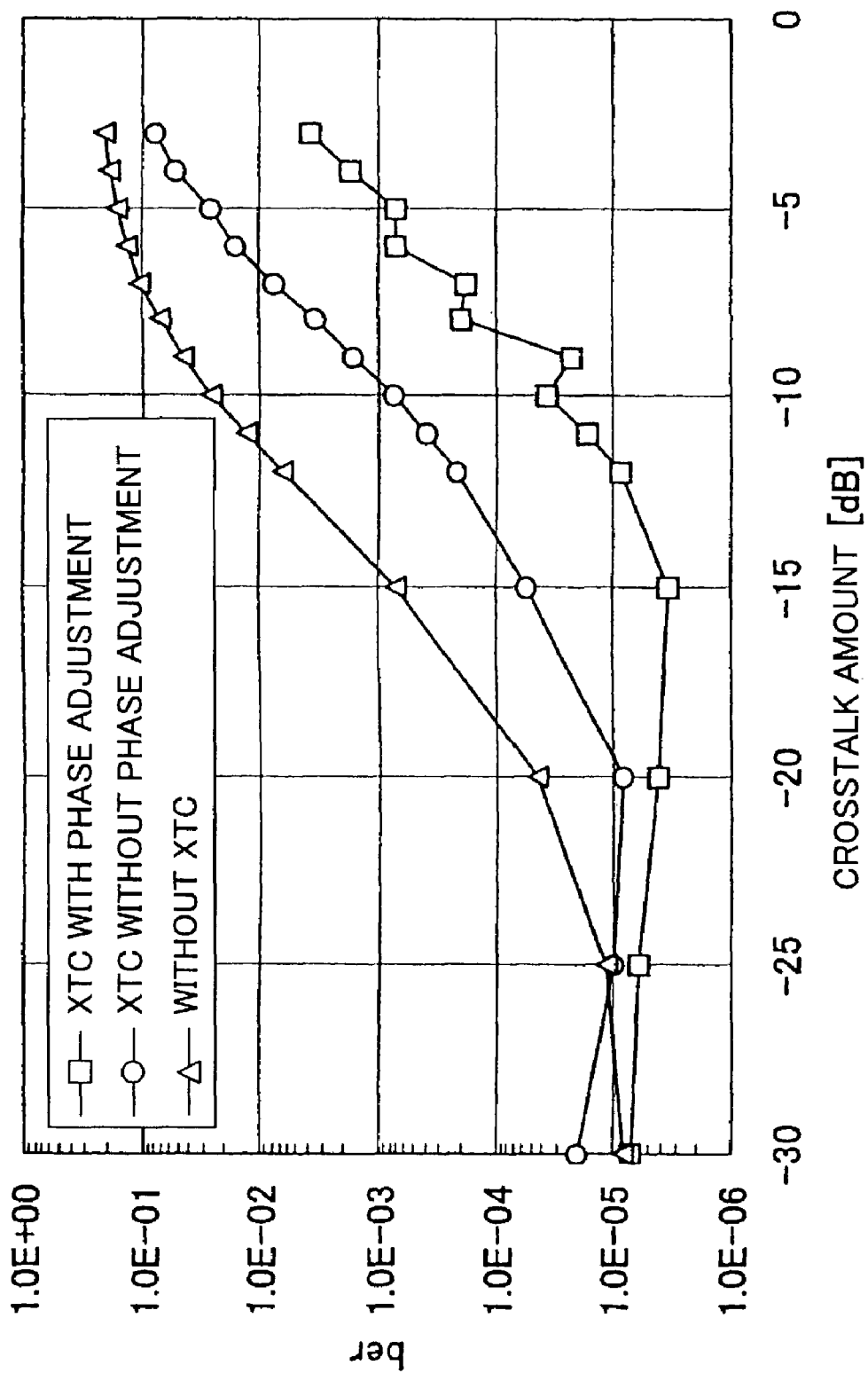
FIG. 21 is a figure showing an example of a relation between magnitude of crosstalk and a bit error rate of reproduced data with and without crosstalk cancellation being performed.

A bit error rate simulations of data reproduction by the data reproducing apparatus of the present invention are shown in FIG. 20 and FIG. 21, with the phase adjusting unit 30 being configured as shown in FIG. 9. The figures also provide the cases where the phase adjustment and the crosstalk cancellation are not performed for comparison purposes.

FIG. 20 shows effects of two crosstalk cancellations, one with the phase adjustment and the other without the phase adjustment. The bit error rate becomes the greater as an amount of the phase difference between the reproduced signal and the crosstalk component gets the greater, when the phase adjustment is not applied to the crosstalk cancellation, as shown in FIG. 20 (refer to square marks). On the other hand, when the phase adjustment is applied to the crosstalk cancellation, the bit error rate stays relatively flat (refer to circle marks), as shown in FIG. 20.

As shown in FIG. 21, generally, the greater the crosstalk amount, the poorer the bit error rate is. A curve with triangle marks represents the case where no crosstalk cancellation is applied. A curve with circle marks represents the case where the crosstalk cancellation without the phase adjustment is applied. A curve with square marks represents the case where the crosstalk cancellation with the phase adjustment is applied. It is evident from FIG. 21 that applying the crosstalk cancellation with the phase adjustment, such as used by the data reproduction apparatus of the present invention, provides the lowest bit error rates.

The above descriptions referred to the data reproduction apparatus that cancels the crosstalk from an adjoining track. However, there are two adjoining tracks to a target track, and the crosstalk cancellation can be applied to both tracks. In this case, the recording format of the crosstalk measurement area on the magneto-optic disk 10 is configured as shown in FIG. 22, for example.

Figure 22:
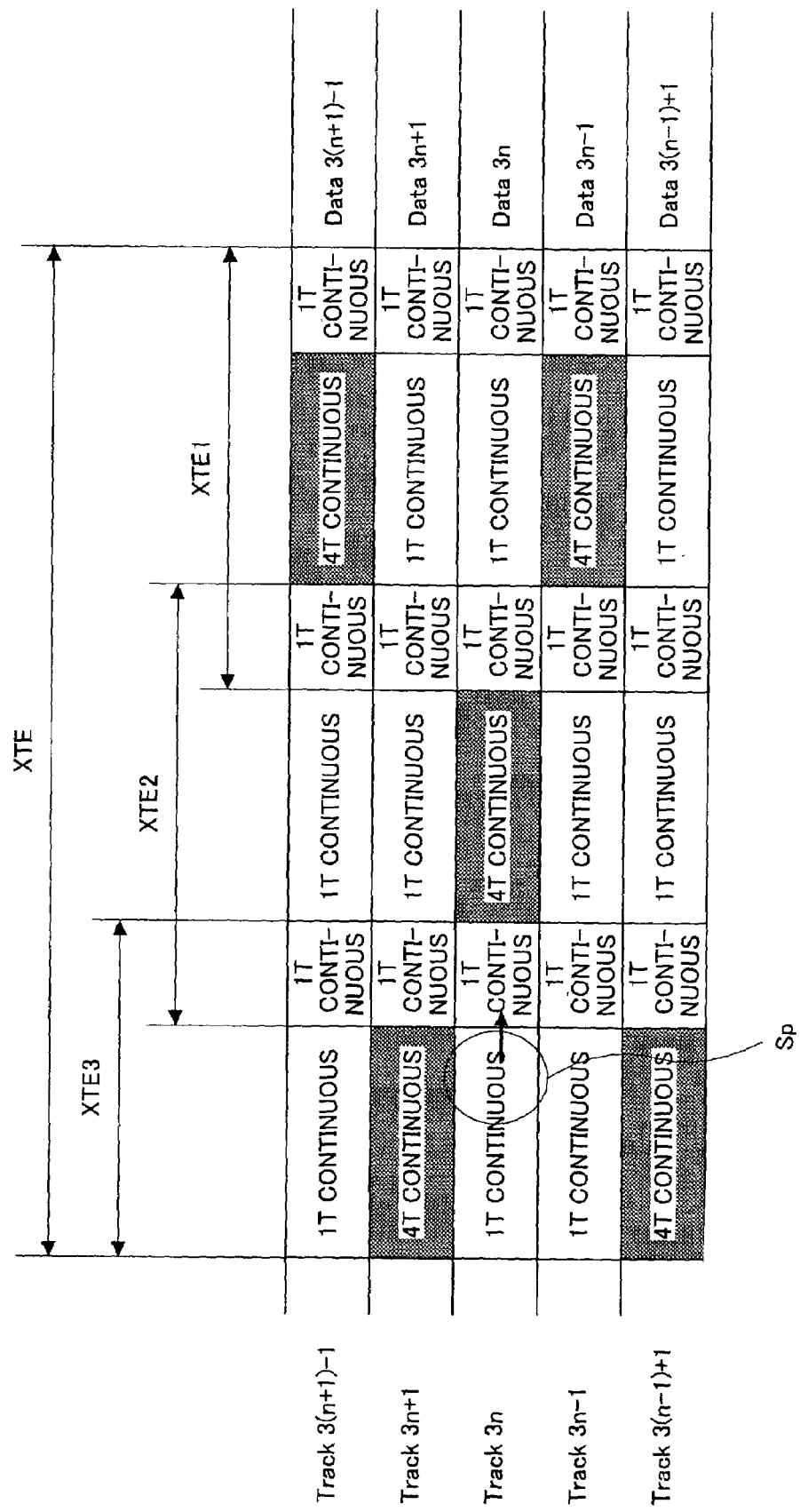
FIG. 22 is a figure showing another example of the pattern recorded on the crosstalk measurement area of a recording medium.

The crosstalk measurement area (XTE) provided before the data area (DATA) in each recording sector of the magneto-optical disk 10 includes a first crosstalk area (XTE1), a second crosstalk area (XTE2), and a third crosstalk area (XTE3) as shown in FIG. 22. As for the 3n-th track, a 4T continuous signal is written in the second crosstalk measurement area (XTE2), and 1T continuous signals are written in the first crosstalk measurement area (XTE1) and the third crosstalk area (XTE3). As for the (3n−1)th track, the 4T continuous signal is written in the first crosstalk measurement area (XTE1), and the 1T continuous signals are written in the second crosstalk measurement area (XTE2) and the third crosstalk measurement area (XTE3). As for the (3n+1)th track, the 4T continuous signal is written in the third crosstalk measurement area (XTE3), and the 1T continuous signals are written in the first crosstalk measurement area (XTE1) and the second crosstalk measurement area (XTE2).

That is, the three tracks above contain the 4T continuous signals without overlapping, i.e., never side-by-side, between the tracks, and separated by 1T continuous signals. Specifically, the 4T continuous signals are provided in the (3n+1)th track, the 3n-th track, and the (3n−1)th track in the third crosstalk measurement area (XTE3), the second crosstalk measurement area (XTE2), and the first crosstalk measurement area (XTE1), respectively.

Here, the 3n-th track is assumed the target track from which a desired signal is to be obtained. When the optical head 12 scans the third crosstalk measurement area (XTE3), the 4T continuous signal obtained is a crosstalk component of the (3n+1)th track. When the second crosstalk measurement area (XTE2) is scanned, the 4T continuous signal obtained is the desired signal of the target track. When the first crosstalk measurement area (XTE1) is scanned, obtained 4T continuous signal is the crosstalk component from the (3n−1)th track.

While the optical head 12 scans, the peak/bottom detector 32 determines magnitude (ratio) of the crosstalk from the (3n+1)th track to the target track, based on a difference between a peak value and a bottom value of the crosstalk component acquired from the third crosstalk measurement area (XTE3), and a difference of a peak value and a bottom value of the desired signal acquired from the second crosstalk measurement area (XTE2). Similarly, magnitude (ratio) of the crosstalk from the (3n−1)th track to the target track is determined based on the difference of the peak value and the bottom value of the desired signal, and a difference between a peak value and a bottom value of a crosstalk component acquired in the first crosstalk measurement area (XTE1).

In the process above, the timing control unit 26 has received track information indicating which one of the (3n+1)th track, the 3n-th track and the (3n−1)th track is the target track from the control unit 50. Then, the timing control unit 26 determines that the 3n-th track is the target track, based on the track information, and outputs a gate signal that defines acquisition timing of a crosstalk component in the third crosstalk measurement area (XTE3) and the first crosstalk measurement area (XTE1), The phase difference measuring unit 23 that receives the gate signal calculates an amount of the phase difference of the crosstalk component of the (3n+1)th track using the n-time sampled data supplied from the A/D converter 18 in the third crosstalk measurement area (XTE3), according to the process mentioned above. Similarly, the phase difference measuring unit 23 calculates an amount of the phase difference of the crosstalk component of the (3n−1)th track from the n-time sampled data supplied from the A/D converter 18 in the first crosstalk measurement area (XTE1), according to the process mentioned above.

The crosstalk data memory unit 28 stores data obtained from the adjoining (3n−1)th track and the (3n+1)th track as crosstalk basic data. When data is retrieved from the 3n-th track, the phase difference adjusting unit 30 generates a data value sequence after the phase adjustment from the crosstalk basic data of the (3n−1)th track, based on the amount of the phase difference of the (3n−1)th track. Similarly, the phase difference adjusting unit 30 generates a data value sequence after the phase adjustment from the crosstalk basic data of the (3n+1)th track, based on the amount of the phase difference of the (3n+1)th track. Then, the gain adjusting unit 34 adjusts gain according to the crosstalk amount (ratio) of each of the data value sequences. The gain-adjusted data values are synthesized into two crosstalk components.

Then, the subtractor 36 subtracts the crosstalk components generated as mentioned above from the sampled values of the reproduced signal supplied from the EQ 20, and crosstalk cancellation is performed.

When each of the (3n−1)th track and the (3n+1)th becomes the target track, crosstalk cancellation is made by almost the same process as above.

In the example mentioned above, the crosstalk basic data is generated from the signal of each of the adjoining tracks, which is decoded by the maximum likelihood decoding unit 22, and stored in the crosstalk data memory unit 28. However, the crosstalk basic data may be sampling values of data to be reproduced from the adjoining tracks, as the conventional practice performs. In that case, the PR synthesizing unit 301 in the phase adjusting unit 30 (refer to FIG. 9 and FIG. 13) is dispensed with.

The crosstalk data memory unit 28 stores the crosstalk basic data used in order to generate a crosstalk component in the example. The crosstalk basic data may be address information recorded in the adjoining track, which is recognized and stored beforehand in the control unit (ODC) 50. In this case, the address information may be provided from the control unit (ODC) 50 to the phase adjusting unit 30.

Further, with reference to FIG. 1, a configuration may be such that the n-time sample data are provided to the phase difference measuring unit 23 from the A/D converter 18 through the EQ 20.

Further, the decoding method is not limited to the maximum likelihood decoding (as performed by the maximum likelihood decoder 22), but a repetition decoding technique of a turbo sign, an LDPC (Low Density Parity Check) sign, and the like can be applied, according to a coding method at the time of recording.

Although the gain adjustment is performed after the phase adjustment when generating a crosstalk component in the data reproducing apparatus mentioned above, the sequence may be opposite, namely, the phase adjustment may be performed after the gain adjustment.

Although the example mentioned above is about the reproduction system of a magneto-optic disk apparatus, the present invention is applicable also to a data reproducing apparatus using other recording media, such as a magnetic disk.

Correspondences of nomenclatures of the above description and that of the claim in the following are as follows. The peak/bottom detector 32 corresponds to a crosstalk amount detection means, and the phase difference measuring unit 23 corresponds to a phase difference measurement means. Further, the crosstalk data memory unit 28, the phase difference adjusting unit 30, and the gain adjusting unit 34 correspond to a crosstalk component generation means.

Further, the 4T continuous signal recorded in the crosstalk measurement area (TXE) corresponds to a predetermined pattern.

The PR synthesizing unit 301 corresponds to a reproducing signal generation means, and the delay unit 303 and the demultiplexer 304 correspond to an output control means.

As mentioned above, according to the present invention, a crosstalk component that is close to an actual crosstalk can be generated by aligning the phase and the magnitude of the crosstalk, thereby an accurate crosstalk cancellation is realized, using the crosstalk component.

Further, the present invention is not limited to these embodiments, but various variations and modifications may be made without departing from the scope of the present invention.

The present application is based on Japanese priority application No. 2001-392780 filed on Dec. 25, 2001 with the Japanese Patent Office, the entire contents of which are hereby incorporated by reference.

What is claimed is:

1. A data reproducing apparatus, wherein a crosstalk component of at least one adjoining track is removed from a reproduced signal obtained by a reproduction head scanning over a target recording track of a recording medium, and recorded data are reproduced according to a predetermined algorithm from the reproduced signal after removing the crosstalk component, comprising:

crosstalk amount detection means that detects magnitude of the crosstalk component (crosstalk amount) indicative of a degree of influence of the crosstalk from at least one adjoining track to a desired signal from the target recording track, phase difference measurement means that measures an amount of a phase difference between the desired signal and the crosstalk component, and crosstalk component generation means that generates a crosstalk component that should be removed from the reproduced signal, based on the crosstalk amount and the phase difference.

2. The data reproducing apparatus as claimed in claim 1, wherein:

the recording medium comprises a crosstalk measurement area where a predetermined pattern is recorded in a first recording track, which is the target recording track, and in a second recording track, the first and the second tracks adjoining each other, such that the predetermined pattern of the first recording track and the predetermined pattern of the second recording track are not overlapped, and the crosstalk amount detection means determines the crosstalk amount by a relationship between a level of a signal corresponding to the predetermined pattern of the first recording track of the crosstalk measurement area, and a level of a signal corresponding to the predetermined pattern of the second recording track of the crosstalk measurement area, both signals being obtained while scanning the first recording track as the target recording track.

3. The data reproducing apparatus as claimed in claim 1, wherein:

the recording medium comprises a crosstalk measurement area where a predetermined pattern is recorded in a first recording track, which is the target recording track, and in a second recording track, the first and the second tracks adjoining each other, such that the predetermined pattern of the first recording track and the predetermined pattern of the second recording track are not overlapped, and the phase difference measurement means determines the phase difference based on a difference between the crosstalk component from the second recording track, and an ideal crosstalk wave obtained from the predetermined pattern.

4. The data reproducing apparatus as claimed in claim 3, wherein the phase difference measurement means determines the phase difference amount based on a difference between a sequence of sampled values of the crosstalk component sampled at a predetermined synchronous clock, and a sequence of sample values of the ideal crosstalk wave sampled at the predetermined synchronous clock.

5. The data reproducing apparatus as claimed in claim 4, wherein the phase difference measurement means determines the phase difference amount by:

calculating a cross-correlation value $R(\tau)$ based on a sum of products, wherein each of the products is a product of each value of the sampled value sequence of the crosstalk component $v_1(t)$, and each value of the sampled value sequence of the ideal crosstalk wave $v_2(t+\tau)$, obtaining the products by performing calculations as above with the $\tau$ being incremented by a predetermined amount equivalent to one or more cycles of the synchronous clock, identifying a value of $\tau$ at which a maximum value of the $R(\tau)$ is obtained, and determining the identified value of $\tau$ as the phase difference amount.

6. The data reproducing apparatus as claimed in claim 4, wherein the phase difference measurement means determines the phase difference amount by:

calculating a root mean square of differences $S(\tau)$ that is an average of root of square of differences, each of the differences being a difference between each value of the sampled value sequence of the crosstalk component $v_1(t)$, and each value of the sampled value sequence of the ideal crosstalk wave $v_2(t+\tau)$, performing calculations as above with the $\tau$ being incremented by a predetermined amount equivalent to one or more cycles of the synchronous clock, identifying a value of $\tau$ at which a smallest value of the $S(\tau)$ is obtained, and determining the identified value of $\tau$ as the phase difference amount.

7. The data reproducing apparatus as claimed in claim 4, wherein frequency of the predetermined synchronous clock is set at higher than frequency of a synchronous clock for reproduction, at which the reproduced signal are the sampled in order to restore original data.

8. The data reproducing apparatus as claimed in claim 5, wherein the phase difference measurement means calculates the cross-correlation value $R(\tau)$ between each value of the sampled value sequence of the crosstalk component $v_1(t)$, and each value of the ideal crosstalk wave $v_2(t+\tau)$, with the $\tau$ being incremented by an amount equivalent to one cycle of the synchronous clock for reproduction.

9. The data reproducing apparatus as claimed in claim 6, wherein the phase difference measurement means calculates the root mean square of the differences $S(\tau)$ between each value of the sampled value sequence of the crosstalk component $v_1(t)$, and each value of the ideal crosstalk wave $v_2(t+\tau)$, with the $\tau$ being incremented by an amount equivalent to one cycle of the synchronous clock for reproduction.

10. The data reproducing apparatus as claimed in claim 1, wherein the crosstalk component generation means comprises:

crosstalk data storing means that stores beforehand crosstalk basic data as crosstalk basic data, which is identical to data recorded in the adjoining track, and reproduced signal generation means that generates a signal equivalent to a signal that would be obtained from the adjoining track, based on the crosstalk basic data stored in the crosstalk data storing means, which is further processed based on reproducing characteristics of the data reproducing apparatus concerned.

11. The data reproducing apparatus as claimed in claim 1, wherein the crosstalk component generation means comprises:

interpolation processing means that interpolates spaces between each values of the sampled value sequence in synchronization with a synchronous clock for reproduction representing a reproduced signal from at least one adjoining track with a predetermined value at a predetermined interval, and outputs an interpolated data value sequence, output control means that outputs the interpolated data value sequence supplied by the interpolation processing means from terminals corresponding to amounts of the phase difference in synchronization with the synchronous clock for reproduction, gain adjusting means that adjust a gain of a value of the output from the output control means based on the amount of the crosstalk, and subtracting means that subtracts the value of the output after the gain adjustment as the crosstalk component from values of the sampled value sequence that is synchronized with the synchronous clock for reproduction, which represents the reproduced signal.

12. The data reproducing apparatus as claimed in claim 11, wherein the interpolation processing means interpolates according to a technique of the linear interpolation.

13. The data reproducing apparatus as claimed in claim 11, wherein the interpolation processing means interpolates by convolution processing using the impulse response.

14. The data reproducing apparatus as claimed in claim 13, wherein the interpolation processing means performs the convolution processing by an FIR (Finite Impulse Response) filter.

15. The data reproducing apparatus as claimed in claim 10, wherein the reproducing signal generation means generates a sampled value sequence that is synchronized with the synchronous clock for reproduction, representing a signal which should be reproduced from the adjoining track, using the crosstalk basic data based on the reproducing characteristics of the data reproducing apparatus, and interpolation values in predetermined number, which interpolates between values of the sampled value sequence, comprising:

output control means that selectively outputs an interpolated data value sequence that comprises the sampled values and the interpolation values, from a terminal corresponding to a value of the phase difference, in synchronization with the synchronous clock for reproduction, gain adjustment means that adjust gain of each value output by the output control means based on the amount of the crosstalk, and a subtractor that subtracts each value after the gain adjustment, which is the crosstalk component, obtained by the gain adjustment means from each corresponding value of the sampled value sequence that is synchronized with the synchronous clock for reproduction, representing the reproduced signal.

* * * * *